United States Patent
Sawada et al.

[11] Patent Number: 5,970,707
[45] Date of Patent: Oct. 26, 1999

[54] EXHAUST GAS PURIFICATION DEVICE FOR AN INTERNAL COMBUSTION ENGINE

[75] Inventors: Hiroshi Sawada, Gotenba; Junichi Kako, Susono, both of Japan

[73] Assignee: Toyota Jidosha Kabushiki Kaisha, Aichi-Ken, Japan

[21] Appl. No.: 09/150,266

[22] Filed: Sep. 9, 1998

[30] Foreign Application Priority Data

Sep. 19, 1997 [JP] Japan .................................. 9-255252

[51] Int. Cl.$^6$ ........................................................ F01N 3/00
[52] U.S. Cl. .............................. 60/277; 60/285; 60/276; 123/691
[58] Field of Search ............................ 60/277, 285, 286, 60/276; 123/691, 703

[56] References Cited

U.S. PATENT DOCUMENTS

| | | | |
|---|---|---|---|
| 5,377,484 | 1/1995 | Shimizu ................................. | 60/276 |
| 5,713,199 | 2/1998 | Takeshima et al. .................... | 60/276 |
| 5,740,676 | 4/1998 | Agustin et al. ........................ | 60/276 |
| 5,743,084 | 4/1998 | Hepburn ................................. | 60/274 |
| 5,749,222 | 5/1998 | Nakajima et al. ..................... | 60/274 |

FOREIGN PATENT DOCUMENTS

| | | |
|---|---|---|
| 3-74540 | 3/1991 | Japan . |
| 5-26032 | 2/1993 | Japan . |
| 5-133264 | 5/1993 | Japan . |
| 5-171922 | 7/1993 | Japan . |
| 5-209510 | 8/1993 | Japan . |
| 6-117310 | 4/1994 | Japan . |
| 8-14030 | 1/1996 | Japan . |
| 8-232644 | 9/1996 | Japan . |
| 8-260949 | 10/1996 | Japan . |
| 8-261041 | 10/1996 | Japan . |
| 9-88560 | 3/1997 | Japan . |
| WO94/17291 | 8/1994 | WIPO . |

OTHER PUBLICATIONS

Copending U.S. Application S.N. 974,843, filed Nov. 10, 1992.
Copending U.S. Application S.N. 988,328, filed Dec. 9, 1992.
Copending U.S. Application S.N. 295,917, filed Jan. 14, 1994.
Copending U.S. Application S.N. 493,657, filed Jun. 22, 1995.
Copending U.S. Application S.N. 620,623, filed Mar. 22, 1996.
Copending U.S. Application S.N. 624,034, filed Mar. 27, 1996.

*Primary Examiner*—Edward K. Look
*Assistant Examiner*—Binh Tran
*Attorney, Agent, or Firm*—Kenyon & Kenyon

[57] ABSTRACT

In an exhaust gas purification device for an internal combustion engine, a three-way catalyst and a $NO_X$ occluding and reducing catalyst (a NORC) are disposed in the exhaust gas passage of an engine in this order from the upstream side. A first air-fuel ratio sensor is disposed in the exhaust gas passage between the three-way catalyst and the NORC, and a second air-fuel ratio sensor is disposed in the exhaust gas passage downstream of the NORC. An engine electronic control unit (ECU) changes the operating air-fuel ratio of the engine from a lean air-fuel ratio to a rich air-fuel ratio and a rich air-fuel ratio to a lean air-fuel ratio in order to evaluate the abilities of the three-way catalyst and the NORC. The ECU evaluates the catalytic abilities based on the output of the first air-fuel ratio sensor when the engine air-fuel ratio is changed. Further, the ECU evaluates the catalytic ability and the $NO_X$ absorbing capacity of the NORC based on the outputs of the first and the second air-fuel ratio sensor when the engine operating air-fuel ratio is changed. The evaluation of the abilities of both the three-way catalyst and the NORC in one successive changing operation of the engine operating air-fuel ratio is based on only the outputs of the first and the second air-fuel ratio sensor.

6 Claims, 12 Drawing Sheets

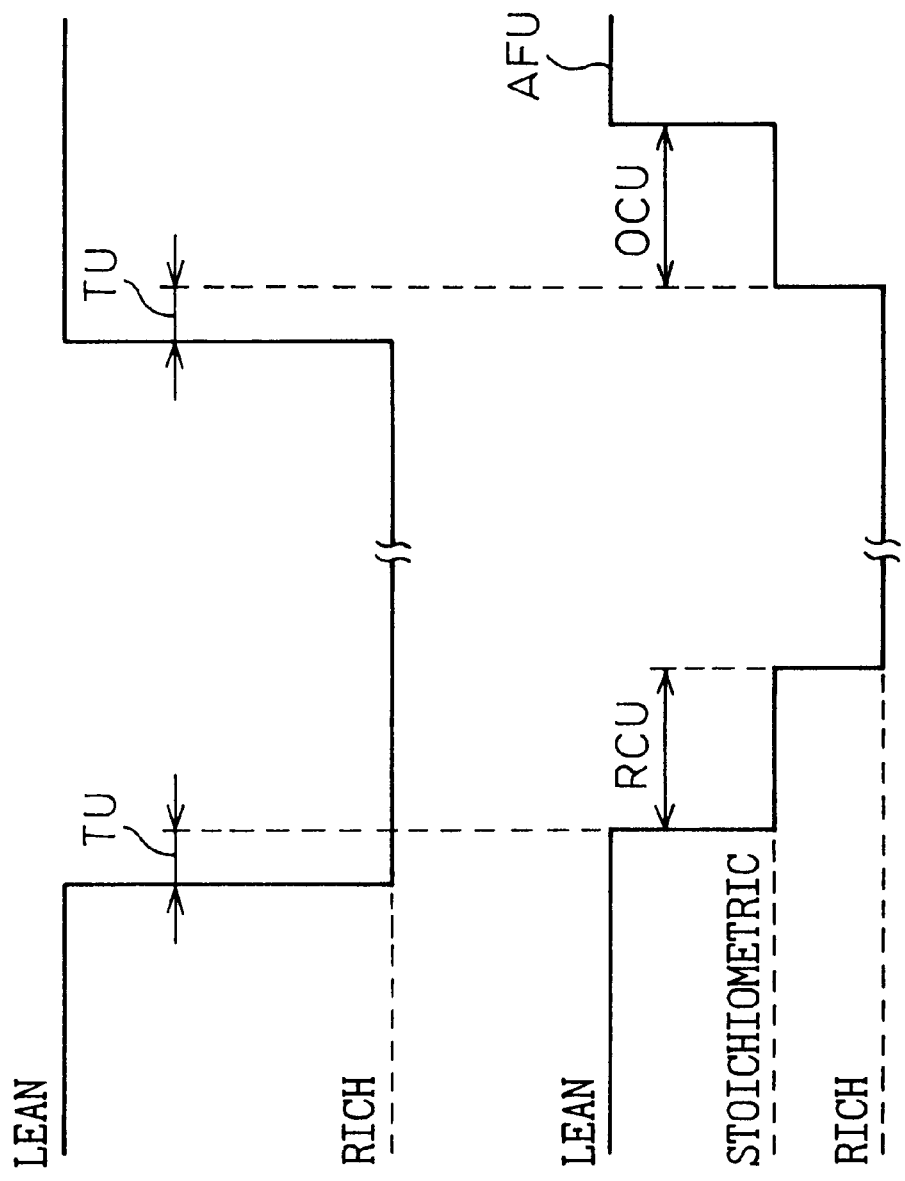

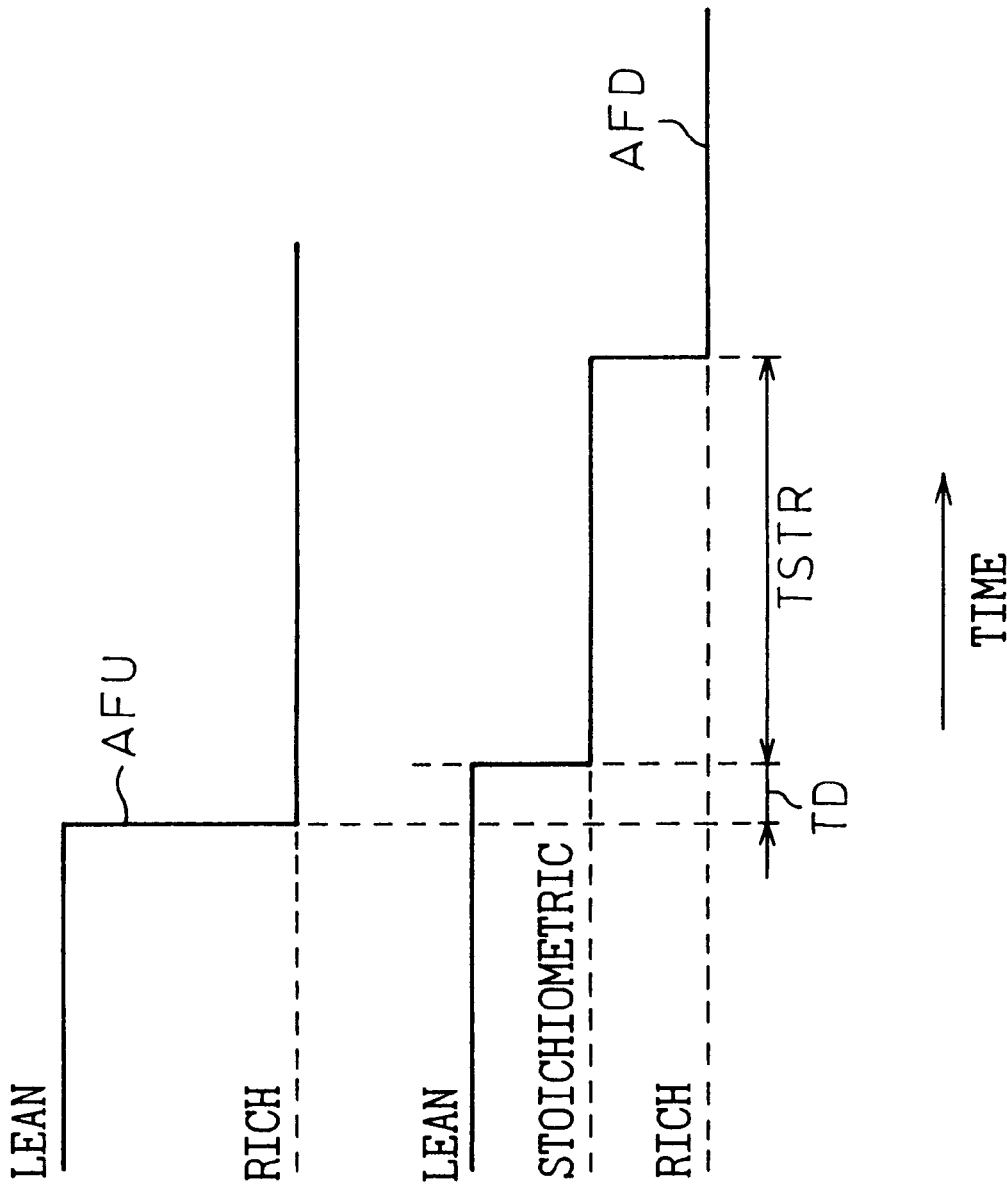

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine.

2. Description of the Related Art

Exhaust gas purification devices utilizing both a three-way catalyst and a $NO_X$ occluding and reducing catalyst are known in the art. A three-way catalyst is capable of purifying HC, CO and $NO_X$ at the same time when the air-fuel ratio of the exhaust gas flowing into the three-way catalyst is near a stoichiometric air-fuel ratio. A $NO_X$ occluding and reducing catalyst (herein after referred to as "an NORC") absorbs $NO_X$ in the exhaust gas when the air-fuel ratio of the exhaust gas flowing into the NORC is lean, and releases the absorbed $NO_X$ and reduces the released $NO_X$ and $NO_X$ in the exhaust gas flowing into the NORC when the air-fuel ratio of the exhaust gas flowing into the NORC is a stoichiometric or a rich air-fuel ratio.

In this specification, the term "air-fuel ratio of the exhaust gas" means the ratio of the amounts of air and fuel supplied to the engine and exhaust gas passage upstream of a considered point. Therefore, if air or fuel is not supplied to the exhaust gas passage, the air-fuel ratio of the exhaust gas agrees with an operating air-fuel ratio of the engine (i.e., air-fuel ratio of the combustion in the engine).

In this type of the exhaust gas purification device, when either the three-way catalyst or the NORC deteriorates, the performance of the exhaust gas purification device as a whole deteriorates. Therefore, it is important to evaluate the abilities of the three-way catalyst and the NORC in order to facilitate the replacement of deteriorated catalyst.

Heretofore, various methods are proposed to evaluate the abilities of the three-way catalyst and the NORC.

For example, Japanese Unexamined Patent Publication (Kokai) No. 5-133264 proposes an evaluating device for evaluating the degree of deterioration of a three-way catalyst. The device in the '264 publication utilizes two air-fuel ratio sensors disposed in the exhaust gas passage of an engine upstream and downstream of the three-way catalyst, and evaluates the degree of deterioration of the three-way catalyst based on the amount of the deviation of the output of the downstream air-fuel ratio sensor from the output of the upstream air-fuel ratio sensor when the air-fuel ratio of the exhaust gas flowing into the three-way catalyst changes from a lean air-fuel ratio to a rich air-fuel ratio.

Further, Japanese Unexamined Patent Publication (Kokai) No. 8-232644 discloses an exhaust gas purification device which evaluates the deterioration of a NORC. The device in the '644 publication utilizes upstream and downstream air-fuel ratio sensors disposed in the exhaust gas passage of an engine at the inlet and outlet of the NORC and evaluates the deterioration of the NORC based on the time lapsed when the downstream air-fuel ratio sensor outputs a signal corresponding to a rich air-fuel ratio since the air-fuel ratio of the exhaust gas flowing into has changed from a lean air-fuel ratio to a rich air-fuel ratio.

However, when both of the abilities of a three-way catalyst and an NORC are evaluated by the devices in the above-explained publications, problems will occur.

For example, the devices of the '264 publication and the '644 publication require two air-fuel ratio sensors disposed in the exhaust gas passage upstream and downstream of the respective catalyst. Therefore, a total of three air-fuel ratio sensors are required for evaluating both of the abilities of the three-way catalyst and the NORC. This increases the manufacturing cost of the device due to an increase in the number of the air-fuel ratio sensors.

Further, the devices in the '264 publication and the '644 publication evaluate the abilities of catalysts having difference functions (i.e., the three-way catalyst and the NORC, respectively) and the methods used for the evaluation of the abilities of the three-way catalyst and the NORC are different from each other. Therefore, even if air-fuel ratio sensors are provided in the exhaust gas passage upstream and downstream of the respective catalysts, the evaluating operations of the catalysts must be performed separately, i.e., two evaluating operation must be performed for evaluating the abilities of the three-way catalyst and the NORC. During the evaluating operations of the catalysts, the engine is operated at an air-fuel ratio different from that in the normal operation of the engine and this air-fuel ratio during the evaluating operation is not necessarily optimum from the viewpoint of the exhaust emission or the performance of the engine. Therefore, when the separate evaluating operations for the three-way catalyst and the NORC are required, the frequency of the worsening of the performance and the emission of the engine increases.

SUMMARY OF THE INVENTION

In view of the problems in the related art as set forth above, the object of the present invention is to provide an exhaust gas purification device which is capable of evaluating both the abilities of the three-way catalyst and the NORC in one evaluating operation without increasing the number of the air-fuel ratio sensors.

The object as set forth above is achieved by an exhaust gas purification device, according to the present invention, comprising a three-way catalyst disposed in the exhaust gas passage of an internal combustion engine, a $NO_X$ occluding and reducing catalyst disposed in the exhaust gas passage downstream of the three-way catalyst and absorbing $NO_X$ in the exhaust gas when the air-fuel ratio of the exhaust gas flowing into the $NO_X$ occluding and reducing catalyst is at a lean air-fuel ratio and releasing and reducing the absorbed $NO_X$ when the air-fuel ratio of the exhaust gas flowing into the $NO_X$ occluding and reducing catalyst is at a stoichiometric or a rich air-fuel ratio, a first air-fuel ratio sensor disposed in the exhaust gas passage at the position between the three-way catalyst and the $NO_X$ occluding and reducing catalyst, a second air-fuel ratio sensor disposed in the exhaust gas passage downstream of the $NO_X$ occluding and reducing catalyst, air-fuel ratio control means for switching the air-fuel ratio of the exhaust gas flowing into the three-way catalyst either from a rich air-fuel ratio to a lean air-fuel ratio or from a lean air-fuel ratio to a rich air-fuel ratio and evaluating means for evaluating the abilities of both of the three-way catalyst and the $NO_X$ occluding and reducing catalyst when the air-fuel ratio control means switches the air-fuel ratio of the exhaust gas either from a rich air-fuel ratio to a lean air-fuel ratio or from a lean air-fuel ratio to a rich air-fuel ratio, wherein the evaluating means evaluates the ability of the three-way catalyst based on the output signal of the first air-fuel ratio sensor and evaluates the ability of the $NO_X$ occluding and reducing catalyst based on the output signals of both the first and the second air-fuel ratio sensors.

According to the present invention, both of the abilities of the three-way catalyst and the NORC are evaluated by one evaluating operation in which the air-fuel ratio of the exhaust gas flowing into the three-way catalyst, i.e., the operating air-fuel ratio of the engine is changed either from a rich air-fuel ratio to a lean air-fuel ratio or from a lean air-fuel ratio to a rich air-fuel ratio. Further, in the evaluating operation, the ability of the three-way catalyst is evaluated in accordance with the output signal of the first air-fuel ratio sensor, and the ability of the NORC is evaluated in accordance with the output signals of the first and the second air-fuel ratio sensors. Namely, in the present invention, the abilities of both the three-way catalyst and the NORC can be evaluated based on the output signals of two air-fuel ratio sensors in one changing operation of the engine operating air-fuel ratio (i.e., from a rich air-fuel ratio to a lean air-fuel ratio or vice versa). Therefore, the increase in the manufacturing cost of the exhaust gas purification device due to increase in the number of the air-fuel ratio sensors does not occur, and the frequency of the worsening of the engine performance and the exhaust emission can be kept to a minimum.

BRIEF DESCRIPTION OF THE DRAWINGS

The present invention will be better understood from the description, as set forth hereinafter, with reference to the accompanying drawings in which:

FIGS. 2(A) and 2(B) are diagrams explaining an example of a method for evaluating the ability of the three-way catalyst;

FIGS. 3(A) and 3(B) are diagrams explaining an example of a method for evaluating the $NO_X$ absorbing capacity of the NORC;

DESCRIPTION OF THE PREFERRED EMBODIMENT

Hereinafter, an embodiment of the exhaust gas purification device according to the present invention will be explained with reference to FIGS. 1 through 15.

Figure 1:
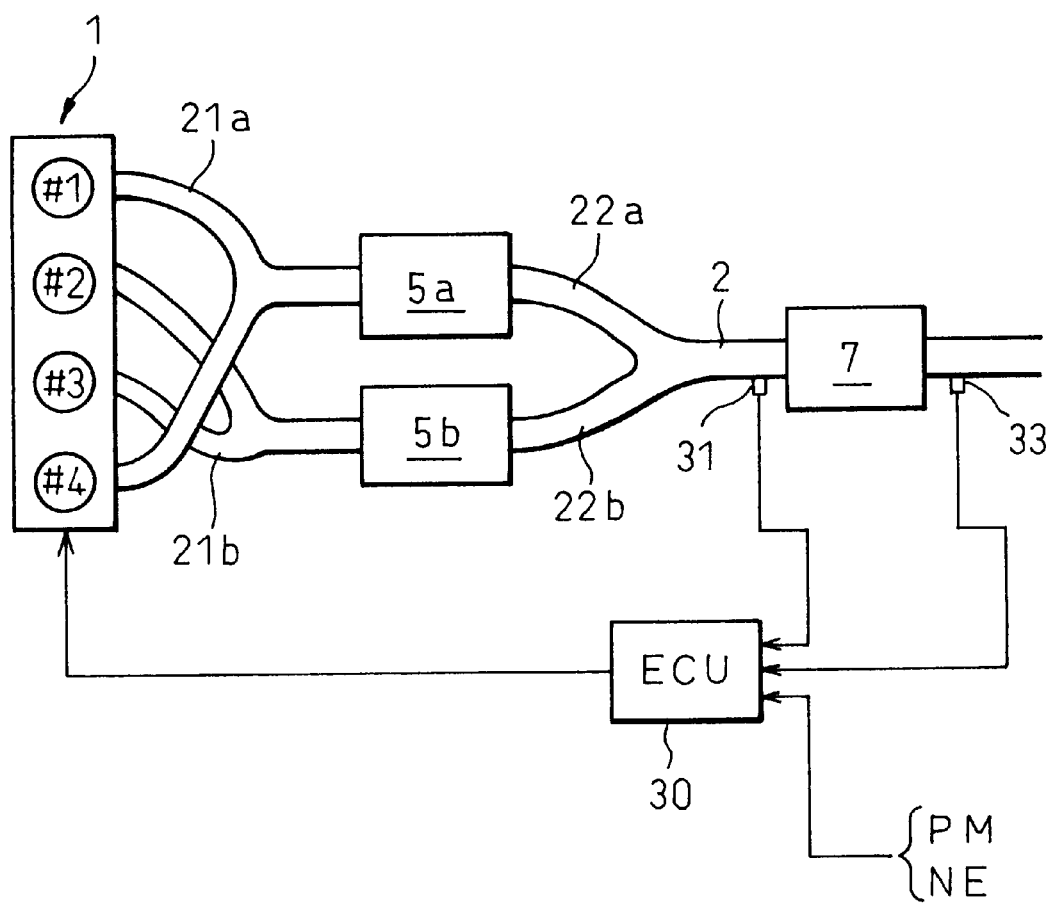
FIG. 1 schematically illustrates the general configuration of an embodiment of the exhaust gas purification device according to the present invention when it is applied to an internal combustion engine for an automobile.

FIG. 1 is a drawing schematically illustrating the general configuration of an embodiment of the present invention when it is applied to an internal combustion engine for an automobile.

In FIG. 1, reference numeral 1 represents an internal combustion engine for an automobile. In this embodiment, the engine 1 is a spark-ignited four-cycle four-cylinder engine having No. 1 through No. 4 cylinders. However, the present invention can be applied to other type of internal combustion engines such as a diesel engine.

In this embodiment, the cylinders of the engine which are not in a successive firing order form two groups of cylinders, and each group of cylinders are connected to separate branch exhaust gas passages. Namely, since the firing order of the engine 1 is 1-3-4-2, the No. 1 and No. 4 cylinders are connected to a branch exhaust gas passage 22a via an exhaust gas manifold 21a and the No. 2 and No. 3 cylinders are connected to a branch exhaust gas passage 22b via an exhaust gas manifold 21b. On the respective branch exhaust gas passages 22a and 22b, three-way catalysts 5a and 5b having relatively small capacities are disposed. The three-way catalysts 5a and 5b are capable of removing three pollutants in the exhaust gas, i.e., HC, CO and $NO_X$, at the same time when the air-fuel ratio of the exhaust gas flowing into the catalysts 5a and 5b is within a narrow range around the stoichiometric air-fuel ratio. The three-way catalysts 5a and 5b are capable of reducing $NO_X$ in the exhaust gas when the air-fuel ratio of the exhaust gas is lower than the above-noted range (i.e., when the air-fuel ratio is rich), and is capable of oxidizing HC and CO in the exhaust gas when the air-fuel ratio of the exhaust gas is higher than the above-noted range (i.e., when the air-fuel ratio is lean). The branch exhaust gas passages 22a and 22b merge into a common exhaust gas passage 2 at downstream of the three-way catalysts 5a and 5b. On the common exhaust gas passage 2, a $NO_X$ occluding and reducing catalyst (an NORC) 7 is disposed. The NORC 7 is explained later in detail.

In this embodiment, a first air-fuel ratio sensor 31 and a second air-fuel ratio sensor 33 are disposed in the common exhaust gas passage 2 at the inlet and the outlet of the NORC 7, respectively. The air-fuel ratio sensors 31 and 33 are linear air-fuel ratio sensors which generate continuous output signals having one-to-one correspondence with the air-fuel ratio of the exhaust gas.

Reference numeral 30 in FIG. 1 designates an electronic control unit (ECU) of the engine 1. The ECU 30 may be constructed as a microcomputer of a known type including a read-only memory (ROM), a random-access memory (RAM), a microprocessor (CPU) and input/output ports all connected to each other by a bi-directional bus. The ECU 30 performs basic control of the engine 1 such as a fuel injection control and an ignition control. Further, the ECU 30 in this embodiment acts as various means stated in the claims such as the air-fuel ratio control means and the evaluating means.

To facilitate these controls, air-fuel ratio signals from the first and the second air-fuel ratio sensors 31 and 33 are supplied to the input port of the ECU 30 via an analog to digital (AD) converter (not shown). Further, signals representing the engine operating condition such as the speed NE of the engine 1 and the intake air pressure PM are supplied to the input port from various sensors (not shown). The output port of the ECU 30 is connected to the fuel injection valves and the ignition plugs of the respective cylinders of the engine in order to control the fuel injection amount, fuel injection timing and the ignition timing of the engine 1.

In this embodiment, the ECU 30 operates the engine 1 in the normal operation (i.e., when the evaluating operation of the ability of the catalysts is not performed) at a lean air-fuel ratio in most of the operating range, and performs rich spike operations periodically in order to operate the engine 1 at a rich air-fuel ratio for a short time.

Further, in the evaluating operation of the catalysts, the ECU 30 changes the operating air-fuel ratio of the engine from a lean air-fuel ratio to a predetermined target rich air-fuel ratio and, after maintaining the air-fuel ratio at the target rich air-fuel ratio for a predetermined period, returns the operating air-fuel ratio to a lean air-fuel ratio.

The three-way catalysts 5a and 5b are a known type which uses, for example, a honeycomb type substrate. On this substrate, an alumina layer which acts as a carrier of the catalytic components are attached. In this embodiment, catalytic components of precious metals such as platinum (Pt), palladium (Pd) and rhodium (Rh) and additives such as cerium (Ce) are attached to the alumina carrier. As is well known, the three-way catalysts 5a and 5b can remove HC, CO and $NO_X$ components from the exhaust gas effectively when the air-fuel ratio of the exhaust gas is near the stoichiometric air-fuel ratio. Further, the three-way catalysts 5a and 5b absorb and hold oxygen in the exhaust gas when the air-fuel ratio of the exhaust gas is a lean air-fuel ratio, and release oxygen when the air-fuel ratio of the exhaust gas becomes a rich air-fuel ratio due to cerium (Ce) added to the three-way catalysts 5a and 5b. Namely, cerium added to the three-way catalyst combines with oxygen in the exhaust gas and forms ceria (CeO) when the exhaust gas has a lean air-fuel ratio. When the air-fuel ratio of the exhaust gas becomes a rich air-fuel ratio, ceria (CeO) releases oxygen and returns to metal cerium. Thus, oxygen is absorbed in and released from the three-way catalysts 5a and 5b. In this embodiment, the capability of the three-way catalyst for absorbing and releasing oxygen is referred to as an $O_2$ storage capability. The three-way catalysts 5a and 5b in this embodiment are disposed in the branch exhaust gas passages 22a and 22b mainly for purifying (oxidizing) HC and CO produced in the exhaust gas in a relatively large amount during the start-up period of the engine 1.

Next, the NORC (the $NO_X$ occluding and reducing catalyst) 7 will be explained.

The NORC 7 in this embodiment comprises precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y). The NORC absorbs $NO_X$ (nitrogen oxide) in the exhaust gas when the air-fuel ratio of the exhaust gas flowing into the NORC is lean, and releases the absorbed $NO_X$ when the oxygen concentration of the exhaust gas flowing through the NORC becomes low.

Though the mechanism of this absorbing and releasing operation of the NORC is not clear at present, it is thought that the absorbing and releasing operation uses the following mechanism. Though the following mechanism of the absorbing and releasing operation of the NORC is explained for the case where platinum Pt and barium Ba are used, as an example, it is thought that similar mechanisms also apply even if other precious metal, alkali metals, alkali earth metals, or rare earth metals are used.

Namely, when the concentration of $O_2$ in the exhaust gas increases, i.e., when the air-fuel ratio of the exhaust gas becomes lean, the oxygen $O_2$ in the exhaust gas is deposited on the surface of platinum Pt in the form of $O_2^-$ or $O^{2-}$. NO in the exhaust gas reacts with $O_2^-$ or $O^{2-}$ on the surface of the platinum Pt and becomes $NO_2$ by the reaction $2NO + O_2 \rightarrow 2NO_2$. Then, $NO_2$ in the exhaust gas and the $NO_2$ produced on the platinum Pt are further oxidized on the surface of platinum Pt and absorbed into the NORC while bonding with barium oxide BaO and diffusing in BaO in the form of nitric acid ions $NO_3^-$. Thus, $NO_X$ in the exhaust gas is absorbed by the NORC when the air-fuel ratio of the exhaust gas is lean.

On the other hand, when the oxygen concentration in the exhaust gas becomes low, i.e., when the air-fuel ratio of the exhaust gas becomes stoichiometric or rich, the production of $NO_2$ on the surface of the platinum Pt is lowered and the reaction proceeds in an inverse direction ($NO_3^- \rightarrow NO_2$), and thus nitric acid ions $NO_3^-$ in barium oxide BaO are released in the form of $NO_2$ from the NORC.

In this case, if a reducing substance such as CO, or a substance such as HC and $CO_2$ exist in the exhaust gas, the released $NO_X$ is reduced on the platinum Pt by these components. Namely, the NORC performs the absorbing and releasing operation of $NO_X$ in the exhaust gas in which $NO_X$ in the exhaust gas is absorbed by the NORC when the air-fuel ratio of the exhaust gas is lean and, when the air-fuel ratio of the exhaust gas becomes stoichiometric or rich, $NO_X$ is released from the NORC and reduced.

Since the NORC absorbs and holds $NO_X$ therein in the form of nitric acid combined with absorbent such as BaO, the NORC cannot absorb $NO_X$ when the absorbent is saturated with nitric acid ions. If the NORC is saturated with nitric acid ions, $NO_X$ in the exhaust gas passes through the NORC without being absorbed and diffuses into the atmosphere even if the air-fuel ratio of the exhaust gas is lean.

Therefore, in order to prevent the NORC from being saturated with the absorbed $NO_X$, a rich spike operation is performed after the engine has been operated at a lean air-fuel ratio for a predetermined period. In the rich spike operation, the operating air-fuel ratio of the engine is switched to a rich air-fuel ratio and, after being kept at the rich air-fuel ratio for a short period, is again switched to the lean air-fuel ratio. Since the $NO_X$ absorbed in the NORC is released and reduced during the rich air-fuel ratio operation, saturation of the NORC with the absorbed $NO_X$ does not occur.

In this embodiment, the rich spike operation is carried out when the amount of the $NO_X$ absorbed in the NORC reaches a predetermined value. In this case, since it is considered that the amount of the $NO_X$ absorbed in the NORC is proportional to the length of a lean air-fuel ratio operation of the engine, the rich spike operation may be carried out when the engine is operated at a lean air-fuel ratio for a predetermined period. Further, it is considered that the amount of $NO_X$ absorbed in the NORC is proportional to the amount of lean air-fuel ratio exhaust gas flowing into the NORC, the rich spike operation may be carried out when the cumulative amount of the exhaust gas flowing into the NORC reaches a predetermined value. In this case, a cumulative amount of the revolution of the engine may be used as a parameter representing the cumulative amount of the exhaust gas, and the rich spike operation may be carried out when the cumulative engine revolution reaches a predetermined value.

Further, since it is considered that the amount of the $NO_X$ absorbed in the NORC is proportional to the cumulative amount of $NO_X$ in the exhaust gas flowing into the NORC, the rich spike operation may be carried out when the cumulative amount of $NO_X$ in the exhaust gas flowing into the NORC reaches a predetermined value. In this case, the relationship between the amount of $NO_X$ emitted from the engine per unit time (i.e., a $NO_X$ generation rate) and the engine operating condition (such as engine load and speed) are obtained previously by experiment and stored in the ROM of the ECU 30. During the lean air-fuel ratio operation of the engine, the ECU 30 calculates the $NO_X$ generation rate at predetermined intervals based on the engine operating condition, and performs the rich spike operation when the cumulative value of the calculated $NO_X$ generation rate reaches a predetermined value.

In this embodiment, the interval between the rich spike operations is determined using one of the methods explained above.

The three-way catalysts 5a, 5b and the NORC 7 deteriorate when used for a long time. When the three-way catalysts 5a and 5b deteriorate, the purification of HC, CO discharged from the engine during the start-up period becomes insufficient and the exhaust emission during the start-up period becomes worse. Therefore, it is important to evaluate the catalytic ability of the three-way catalyst in order to prevent the worsening of the exhaust emission. Further, when the NORC deteriorates, since the capacity for absorbing $NO_X$ also decreases, the NORC may be saturated with the absorbed $NO_X$ during the lean air-fuel ratio operation. Once the NORC is saturated with the absorbed $NO_X$, the NORC cannot absorb $NO_X$ in the exhaust gas any more and $NO_X$ in the exhaust gas passes through the NORC and diffuses into the atmosphere. Therefore, it is important to evaluate the $NO_X$ absorbing capacity of the NORC in order to prevent $NO_X$ from diffusing into the atmosphere.

Further, during the rich spike operation, the $NO_X$ released from the absorbent is reduced on the surface of the catalytic components (such as platinum Pt) of the NORC. Therefore, when the ability of the catalytic components as a reducing catalyst deteriorates, the $NO_X$ released from the absorbent is discharged from the NORC without being reduced even if the $NO_X$ absorbing capacity of the NORC has not deteriorated.

Thus, in order to prevent the worsening of the exhaust emission, it is important to evaluate both the ability of the three-way catalyst and the ability of the NORC including the $NO_X$ absorbing capacity and the catalytic ability of the NORC. In this case, if the evaluations of the abilities of the three-way catalyst and the NORC are performed separately, the engine operating air-fuel ratio is changed in every evaluating operation, and the frequency of worsening of the exhaust emission and the performance of the engine increases.

In this embodiment, this problem is eliminated by evaluating both the abilities of the three-way catalyst and the NORC in one evaluating operation, i.e., in one changing operation of the engine air-fuel ratio based on the outputs of only the first and the second air-fuel ratio sensors.

Next, the methods for evaluating the abilities of the three-way catalysts 5a, 5b and the NORC 7 used in this embodiment will be explained.

(1) The three-way catalyst

In this embodiment, the following two separate methods (1-A) and (1-B) are used for evaluating the ability of the three-way catalysts 5a and 5b.

(1-A) The method based on the length of the period in which the output of the fist air-fuel ratio sensor 31 is maintained at the level corresponding to a stoichiometric air-fuel ratio after the air-fuel ratio of the exhaust gas flowing into the three-way catalyst has changed from a lean air-fuel ratio to a rich air-fuel ratio.

(1-B) The method based on the length of the period in which the output of the fist air-fuel ratio sensor 31 is maintained at the level corresponding to a stoichiometric air-fuel ratio after the air-fuel ratio of the exhaust gas flowing into the three-way catalyst has changed from a rich air-fuel ratio to a lean air-fuel ratio.

The methods (1-A) and (1-B) evaluate the ability of the three-way catalyst based on the deterioration of an $O_2$ storage capability of the three-way catalyst. As explained before, the three-way catalyst in this embodiment is provided with an $O_2$ storage capability for absorbing and storing $O_2$ in the exhaust gas when the air-fuel ratio of the exhaust gas is a lean air-fuel ratio and releasing the stored $O_2$ when the air-fuel ratio of the exhaust gas becomes a rich air-fuel ratio. It is known that this $O_2$ storage capability deteriorates as the ability of the three-way catalyst as an oxidizing and reducing catalyst deteriorates. Namely, the amount of $O_2$ absorbed and released by the three-way catalyst becomes smaller as the catalytic ability of the three-way catalyst deteriorates. Therefore, the catalytic ability of the three-way catalyst can be evaluated by measuring the amount of $O_2$ absorbed in and released from the three-way catalysts 5a and 5b.

FIGS. 2(A) and 2(B) illustrate the evaluation of the catalytic ability of the three-way catalysts 5a and 5b by the methods (1-A) and (1-B). FIG. 2(A) shows the change in the air-fuel ratio of the exhaust gas flowing into the three-way catalyst and FIG. 2(B) shows the change in the air-fuel ratio of the exhaust gas detected by the first air-fuel ratio sensor 31 when the air-fuel ratio of the exhaust gas flowing into the three-way catalyst changes as illustrated in FIG. 2(A).

When the air-fuel ratio of the exhaust gas flowing into the three-way catalyst changes from a lean air-fuel ratio to a rich air-fuel ratio as indicated in FIG. 2(A), the air-fuel ratio of the exhaust gas downstream of the three-way catalyst does not change to a rich air-fuel ratio immediately. The air-fuel ratio of the downstream exhaust gas (i.e., the air-fuel ratio of the exhaust gas flowing out from the three-way catalyst) changes to a stoichiometric air-fuel ratio after a delay time TU (FIG. 2(B)) has lapsed since the air-fuel ratio of the upstream exhaust gas (i.e., the air-fuel ratio of the exhaust gas flowing into the three-way catalyst) has changed from a lean air-fuel ratio to a rich air-fuel ratio. The air-fuel ratio of the downstream exhaust gas changes to a rich air-fuel ratio after staying at the stoichiometric air-fuel ratio for a certain period (the period RCU in FIG. 2(B)). As explained before, since the three-way catalysts 5a and 5b are provided with an $O_2$ storage capability, the three-way catalysts 5a and 5b release the absorbed oxygen when the air-fuel ratio of the exhaust gas flowing into the three-way catalysts changed from a lean air-fuel ratio to a rich air-fuel ratio. Therefore, as long as oxygen is released from the three-way catalysts, the air-fuel ratio of the exhaust gas flowing out from the three-way catalyst is maintained at a stoichiometric air-fuel ratio due to the released oxygen. However, when the three-way catalyst releases all the oxygen it has absorbed, since oxygen is not released any more, the air-fuel ratio of the exhaust gas flowing out from the three-way catalyst becomes the same as that of the air-fuel ratio of the exhaust gas flowing into the three-way catalyst.

Therefore, the length of the period in which the output of the first air-fuel ratio sensor 31 stays at the level corresponding to a stoichiometric air-fuel ratio (i.e., the time RCU in FIG. 2(B)) represents the amount of the oxygen absorbed in the three-way catalysts. Namely, the time RCU corresponds to the $O_2$ storage capability of the three-way catalysts 5a and 5b. The delay time TU in FIG. 2(B) represents the time required for the exhaust gas for travelling from the inlet of the three-way catalyst to the position where the first air-fuel ratio sensor 31 is disposed.

A similar phenomenon is found when the air-fuel ratio of the upstream exhaust gas changes from a rich air-fuel ratio to a lean air-fuel ratio. When the air-fuel ratio of the upstream exhaust gas changes from a rich air-fuel ratio to a lean air-fuel ratio, the three-way catalysts absorbs oxygen in the exhaust gas. Therefore, as long as the three-way catalyst absorbs oxygen in the exhaust gas, the air-fuel ratio of the exhaust gas flowing out from the three-way catalysts is maintained at a stoichiometric air-fuel ratio even though the air-fuel ratio of the exhaust gas flowing into the three-way catalyst is a lean air-fuel ratio. However, when the three-way catalysts absorb oxygen to their maximum capacity, since the oxygen in the exhaust gas is not absorbed in the three-way catalyst, the air-fuel ratio of the exhaust gas flowing out from the three-way catalyst becomes the same as that of the exhaust gas flowing into the three-way catalysts. Therefore, the length of the period in which the output of the first air-fuel ratio sensor 31 stays at the level corresponding to a stoichiometric air-fuel ratio when the air-fuel ratio of the upstream exhaust gas has changed from a rich air-fuel ratio to a lean air-fuel ratio (i.e., the time OCU in FIG. 2(B)) represents the maximum amount of the oxygen the three-way catalyst can absorb. Namely, the time OCU also corresponds to the $O_2$ storage capability of the three-way catalysts 5a and 5b. In this embodiment, the stoichiometric air-fuel ratio period RCU in FIG. 2(B) is measured when the engine operating air-fuel ratio is changed from a lean air-fuel ratio to a rich air-fuel ratio, and the stoichiometric air-fuel ratio time OCU in FIG. 2(B) is measured when the engine operating air-fuel ratio is returned from a rich air-fuel ratio to a lean air-fuel ratio. The $O_2$ storage capability of the three-way catalysts 5a and 5b, i.e., the catalytic abilities of the three-way catalysts 5a and 5b are evaluated based on both the stoichiometric air-fuel ratio times RCU and OCU.

(2) The NORC (the $NO_X$ occluding and reducing catalyst) In this embodiment, the $NO_X$ absorbing capacity of the NORC 7 is evaluated by the following two methods (2A-1) and (2-A-2).

(2-A-1) The method based on the length of the period in which the output of the second air-fuel ratio sensor 33 is maintained at the level corresponding to a stoichiometric air-fuel ratio when the air-fuel ratio of the exhaust gas flowing into the NORC has changed from a lean air-fuel ratio to a rich air-fuel ratio.

(2-A-2) The method based on the amount of deviation of the air-fuel ratio of the exhaust gas flowing out from the NORC from the air-fuel ratio of the exhaust gas flowing into the NORC after the air-fuel ratio of the exhaust gas flowing into the NORC has changed from a rich air-fuel ratio to a lean air-fuel ratio.

Further, the ability of the NORC as a reducing catalyst is evaluated by the following method.

(2-B) The method based on the length of the period in which the output of the second air-fuel ratio sensor 33 is maintained at the level corresponding to a stoichiometric air-fuel ratio when the air-fuel ratio of the exhaust gas flowing into the NORC has changed from a rich air-fuel ratio to a lean air-fuel ratio.

Hereinafter, the respective methods will be explained in detail.

(A) The evaluation of the $NO_X$ absorbing capacity of the NORC (the methods (2-A-1) and (2-A-2))

FIGS. 3(A) and 3(B) illustrate the evaluation of the $NO_X$ absorbing capacity based on the above-explained method (2-A-1). FIGS. 3(A) and 3(B) show the change in the air-fuel ratio of the exhaust gas detected by the first air-fuel ratio sensor 31 (the air-fuel ratio of the exhaust gas flowing into the NORC 7) and the air-fuel ratio of the exhaust gas detected by the second air-fuel ratio sensor 33 (the air-fuel ratio of the exhaust gas flowing out from the NORC 7), respectively. When the air-fuel ratio of the exhaust gas upstream of the NORC 7 changes from a lean air-fuel ratio to a rich air-fuel ratio as illustrated in FIG. 3(A), the air-fuel ratio of the exhaust gas downstream of the NORC 7 does not change to a rich air-fuel ratio immediately but stays at a stoichiometric air-fuel ratio until all the $NO_X$ absorbed in the NORC 7 is released (FIG. 3 (B)). When $NO_X$ is released from the NORC, HC and CO in the exhaust gas is used for reducing the released $NO_X$. This causes the concentrations of HC and CO in the exhaust gas downstream of the NORC to become lower than those in the exhaust gas upstream of the NORC. Therefore, when the NORC is releasing $NO_X$, the air-fuel ratio of the exhaust gas passing through the NORC becomes higher, and the exhaust gas downstream of the NORC becomes a stoichiometric air-fuel ratio.

When the NORC has released all the $NO_X$ it has absorbed, since HC and CO in the exhaust gas are not used for reducing $NO_X$, the air-fuel ratio of the exhaust gas downstream of the NORC becomes the same as that of the exhaust gas upstream of the NORC. Therefore, the length of the period in which the output of the second air-fuel ratio sensor 33 stays at a level corresponding to a stoichiometric air-fuel ratio (the time TSTR in FIG. 3(B)) represents the amount of $NO_X$ absorbed and held in the NORC 7. In this embodiment, the time TSTR in FIG. 3(B) is measured when the operating air-fuel ratio of the engine is changed from a lean air-fuel ratio to a rich air-fuel ratio and used as a parameter representing the $NO_X$ absorbing capacity of the NORC 7. In FIG. 3(B), TD is a delay time required for the exhaust gas for travelling from the position of the first air-fuel ratio sensor 31 to the position of the second air-fuel ratio sensor 33.

Figure 4A:
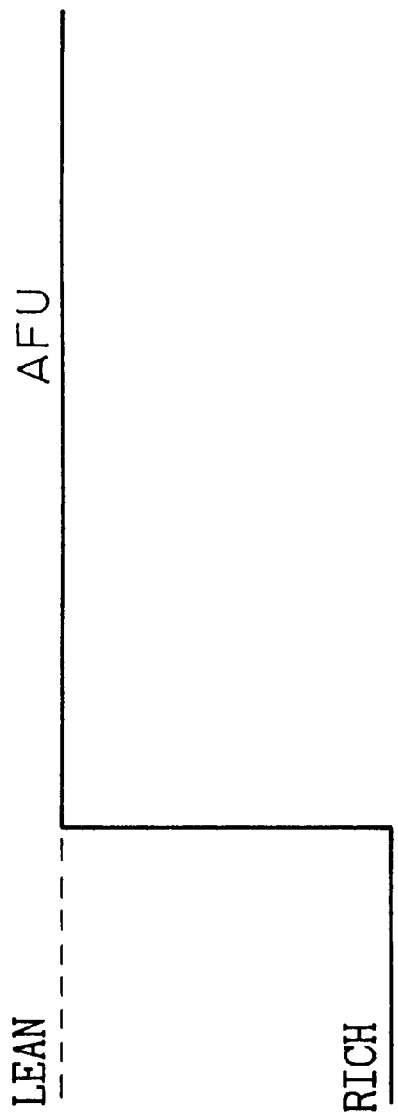
FIGS. 4(A) and 4(B) are diagrams explaining another example of a method for evaluating the $NO_X$ absorbing capacity of the NORC.
Figure 4B:
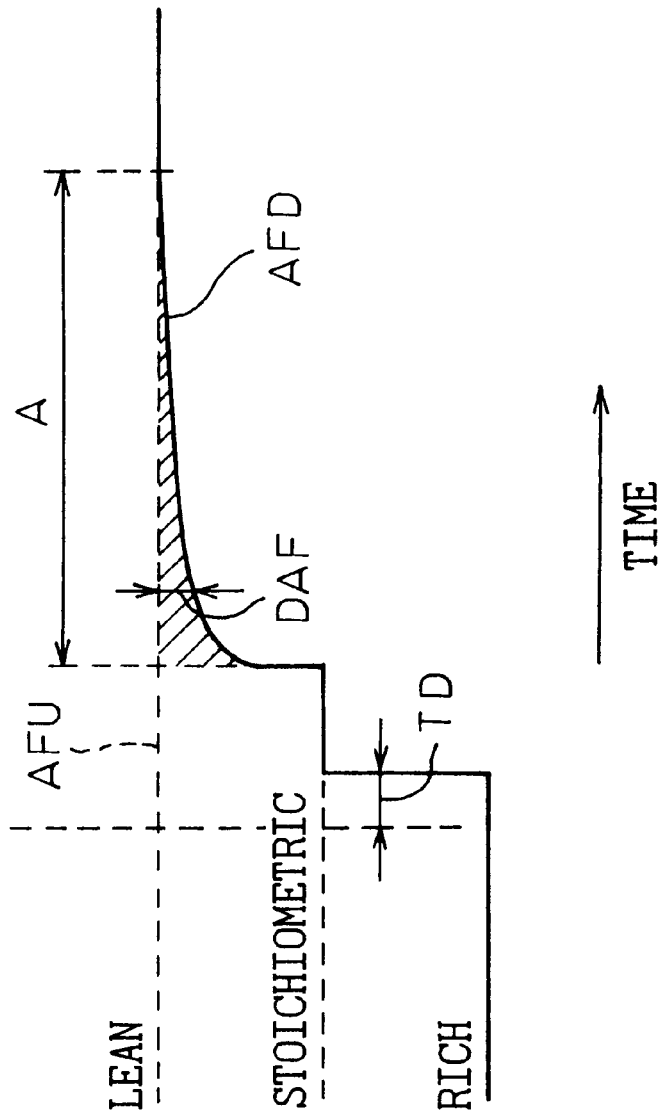

Next, the method (2-A-2) will be explained with reference to FIGS. 4(A) and 4(B). FIGS. 4(A) and 4(B) show the changes in the outputs of the first air-fuel ratio sensor 31 (FIG. 4(A)) and the second air-fuel ratio sensor 33 (FIG. 4(B)) when the engine operating air-fuel ratio is changed from a rich air-fuel ratio to a lean air-fuel ratio. It is assumed that the engine is operated at a rich air-fuel ratio for a sufficiently long period before the operation air-fuel ratio is changed to a lean air-fuel ratio so that the NORC has released all the absorbed $NO_X$ when the air-fuel ratio is changed to a lean air-fuel ratio.

As is seen from FIG. 4(B), the air-fuel ratio of the exhaust gas downstream of the NORC changes to a stoichiometric air-fuel ratio when the delay time TD has lapsed after the air-fuel ratio of the exhaust gas upstream of the NORC has changed to a lean air-fuel ratio, and stays at the stoichiometric air-fuel ratio for a certain period. The reason why the air-fuel ratio of the exhaust gas downstream of the NORC becomes a stoichiometric air-fuel ratio will be explained later.

The air-fuel ratio of the exhaust gas downstream of the NORC changes to a lean air-fuel ratio after it is kept at a stoichiometric air-fuel ratio for a certain time. However, in this case, the air-fuel ratio of the exhaust gas downstream of the NORC does not become the same as that of the exhaust gas upstream of the NORC. Namely, the air-fuel ratio of the downstream exhaust gas takes a value lower than the air-fuel ratio of the upstream exhaust gas, and gradually approaches a value same as the air-fuel ratio of the upstream exhaust gas as time passes (the period A in FIG. 4(B)).

It is considered that the deviation of the air-fuel ratio of the downstream exhaust gas is caused by the absorption of $NO_X$ in the exhaust gas by the NORC 7. As explained before, $NO_X$ in the exhaust gas is absorbed in the absorbent BaO of the NORC 7 in the form of a nitrate $Ba(NO_3)_2$ by the following reaction.

$$2NO+O_2 \rightarrow 2NO_2$$

$$BaO+2NO_2+(\tfrac{1}{2})O_2 \rightarrow Ba(NO_3)_2$$

This means that the NORC 7 uses (¾) moles of oxygen in the exhaust gas to absorb 1 mole of NO. Therefore, when the NORC 7 absorbs $NO_X$ in the exhaust gas, the partial pressure of $O_2$ in the exhaust gas decreases since the $O_2$ in the exhaust gas is used by the NORC 7. This casuses the air-fuel ratio AFD of the downstream exhaust gas to become lower (rich) than the air-fuel ratio AFU of the upstream exhaust gas and the amount of the deviation DAF (difference between the air-fuel ratio of the downstream exhaust gas AFD and the air-fuel ratio of the upstream exhaust gas AFU) becomes a value proportional to the amount of $NO_X$ absorbed in the NORC per unit time.

Figure 5:
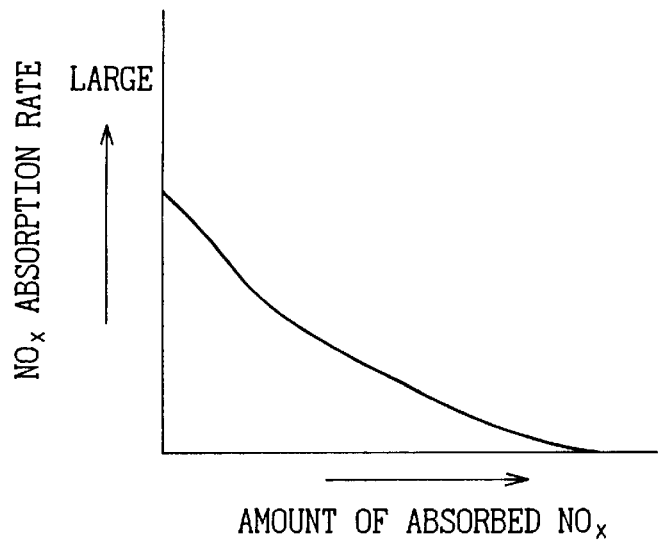
FIG. 5 shows a typical change in the $NO_X$ absorption rate of the NORC in accordance with the amount of $NO_X$ held in the NORC.

FIG. 5 shows the change in the absorption rate of $NO_X$ of NORC (the amount of $NO_X$ absorbed in the NORC per unit time) in accordance with the amount of $NO_X$ absorbed and held in the NORC. The absorption rate of $NO_X$ decreases as the amount of $NO_X$ held in the NORC increases, and becomes 0 when the NORC is saturated with the absorbed $NO_X$. Therefore, the length of the period A in FIG. 4(B), i.e., the time lapsed when the air-fuel ratio of the downstream exhaust gas becomes the same as the air-fuel ratio of the upstream exhaust gas represents the time required for the NORC to be saturated with the absorbed $NO_X$. Thus, it will be understood that the cumulative value of the deviation DAF (i.e., the area of the hatched portion in FIG. 4(B)) represents the maximum $NO_X$ absorbing capacity of the NORC 7.

In this embodiment, the $NO_X$ absorbing capacity of the NORC 7 is first evaluated using the method (2-A-1) when the operating air-fuel ratio of the engine is changed from a lean air-fuel ratio to a rich air-fuel ratio, and is evaluated again by calculating the cumulative value of the amount of deviation DAF when the operating air-fuel ratio of the engine is returned to a lean air-fuel ratio from a rich air-fuel ratio. By evaluating the $NO_X$ absorbing capacity of the NORC by changing the operating air-fuel ratio both from a lean to rich and from a rich to lean, the $NO_X$ absorbing capacity of the NORC can be precisely evaluated.

(B) The evaluation of the catalytic ability of the NORC (the method (2-B))

Next, the evaluation of the catalytic ability (the ability as a reducing catalyst) of the NORC 7 by the method (2-B) is explained. As explained before, in the method (2-B), the catalytic ability of the NORC 7 is evaluated based on the length of the period in which the output of the second air-fuel ratio sensor 33 is maintained at the level corresponding to a stoichiometric air-fuel ratio when the air-fuel ratio of the exhaust gas flowing into the NORC has changed from a rich air-fuel ratio to a lean air-fuel ratio.

Figure 6A:
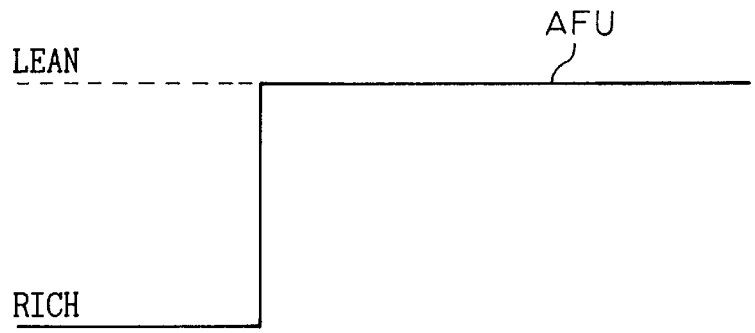
FIGS. 6(A) and 6(B) are diagrams explaining an example of a method for evaluating the ability of the $NO_X$ occluding and reducing catalyst as a reducing catalyst.
Figure 6B:
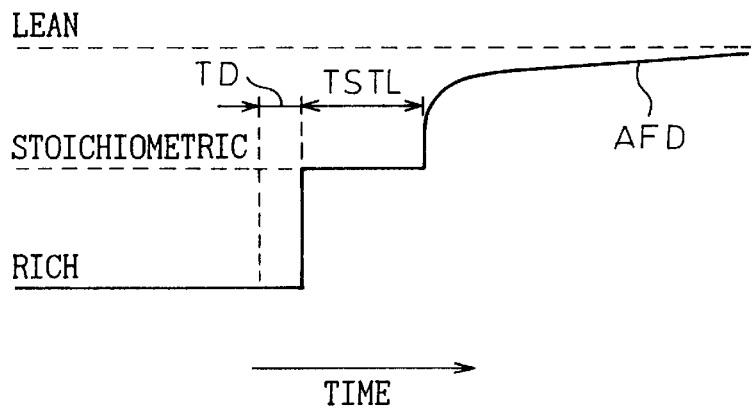

FIGS. 6(A) and 6(B) illustrate the evaluation of the catalytic ability of the NORC by the method (2-B).

FIGS. 6(A) and 6(B) are similar to FIGS. 4(A) and 4(B) illustrating the changes in the air-fuel ratios of the upstream exhaust gas detected by the upstream air-fuel ratio sensor 31 and the downstream exhaust gas detected by the downstream air-fuel ratio sensor 33, respectively, when the operating air-fuel ratio of the engine is changed from a rich air-fuel ratio to a lean air-fuel ratio. In this case, it is also assumed that the engine was operated at a rich air-fuel ratio for a sufficiently long period before the operating air-fuel ratio is changed to a lean air-fuel ratio so that the air-fuel ratio of the downstream exhaust gas has become a rich air-fuel ratio when the operating air-fuel ratio of the engine is changed.

When the air-fuel ratio of the upstream exhaust gas is changed from a rich air-fuel ratio to a lean air-fuel ratio, the air-fuel ratio of the exhaust gas downstream of the NORC, after the delay time TD has lapsed, changes to a stoichiometric air-fuel ratio and stays there for a certain period (TSTL in FIG. 6(B)). The reason why the air-fuel ratio of the downstream exhaust gas is maintained at a stoichiometric air-fuel ratio for a certain period is explained as follows.

When a sufficient time has lapsed after the air-fuel ratio of the upstream exhaust gas has changed to a rich air-fuel ratio, all the $NO_X$ absorbed in the NORC is released. In this condition, $O_2^-$ or $O^{2-}$ attached to the surface of the catalytic components are replaced with HC and CO in the exhaust gas. Therefore, when the air-fuel ratio of the exhaust gas flowing into the NORC changes to a lean air-fuel ratio, the HC and CO attached to the surface of the catalytic component are oxidized by $O_2$ in the exhaust gas. Since $O_2$ in the exhaust gas is used for oxidizing HC, CO on the surface of the catalytic components, the air-fuel ratio of the exhaust gas flowing out from the catalyst becomes a stoichiometric air-fuel ratio. The length of the period (TSTL in FIG. 6(B)) corresponds to the amount of HC and CO oxidized on the surfaces of the catalytic components, i.e., the ability of the NORC as an oxidizing catalyst. Since the ability of the NORC as a reducing catalyst deteriorates as the ability as an oxidizing catalyst deteriorates, the time TSTL can be used as a parameter representing the ability of the NORC as a reducing catalyst.

Therefore, in this embodiment, the ability of the NORC including the $NO_X$ absorbing capacity and the catalytic ability as a reducing catalyst is evaluated using the above explained methods (2-A-1), (2-A-2) and (2-B). In addition to that, the catalytic abilities of the three-way catalysts 5a and 5b are evaluated at the same time by the methods (1-A) and (1-B).

Next, the evaluating operation of the abilities of the three-way catalysts 5a, 5b and the NORC 7 is explained in detail with reference to FIGS. 7 through 15.

In the evaluation in FIGS. 7 through 15, the abilities of the three-way catalysts 5a, 5b and the NORC 7 are evaluated by the ECU 30 in the following procedure.

Namely, when the conditions for performing the evaluating operation are satisfied, the ECU 30 changes the operating air-fuel ratio of the engine from a lean air-fuel ratio to a rich air-fuel ratio and evaluates the abilities of the three-way catalysts 5a, 5b and the $NO_X$ absorbing capacity of the NORC 7 using the methods (1-A) and (2-A-1), respectively. After the engine operating air-fuel ratio is changed to a rich air-fuel ratio, when the air-fuel ratio of the exhaust gas detected by the second air-fuel ratio sensor becomes stable at a rich air-fuel ratio, the ECU 30 changes the engine operating air-fuel ratio again to a lean air-fuel ratio and evaluates the abilities of the three-way catalysts 5a, 5b and the NORC 7 using the methods (1-B) and (2-B). Further, after the evaluations by the methods (1-B) and (2-B) are completed, the $NO_X$ absorbing capacity of the NORC 7 is evaluated by the method (2-A-1). Namely, in this embodiment, the catalytic abilities of the three-way catalysts 5a and 5b, the $NO_X$ absorbing capacity and the catalytic ability of the NORC 7 can be evaluated during one changing operation of the engine operating air-fuel ratio (i.e., a lean air-fuel ratio→a rich air-fuel ratio→a lean air-fuel ratio). Further, each of the catalytic abilities of the three-way catalysts 5a, 5b and $NO_X$ absorbing capacity of the NORC 7 are evaluated twice during the evaluating operation under different conditions. Therefore, the accuracy of the evaluations is improved.

Figure 7:
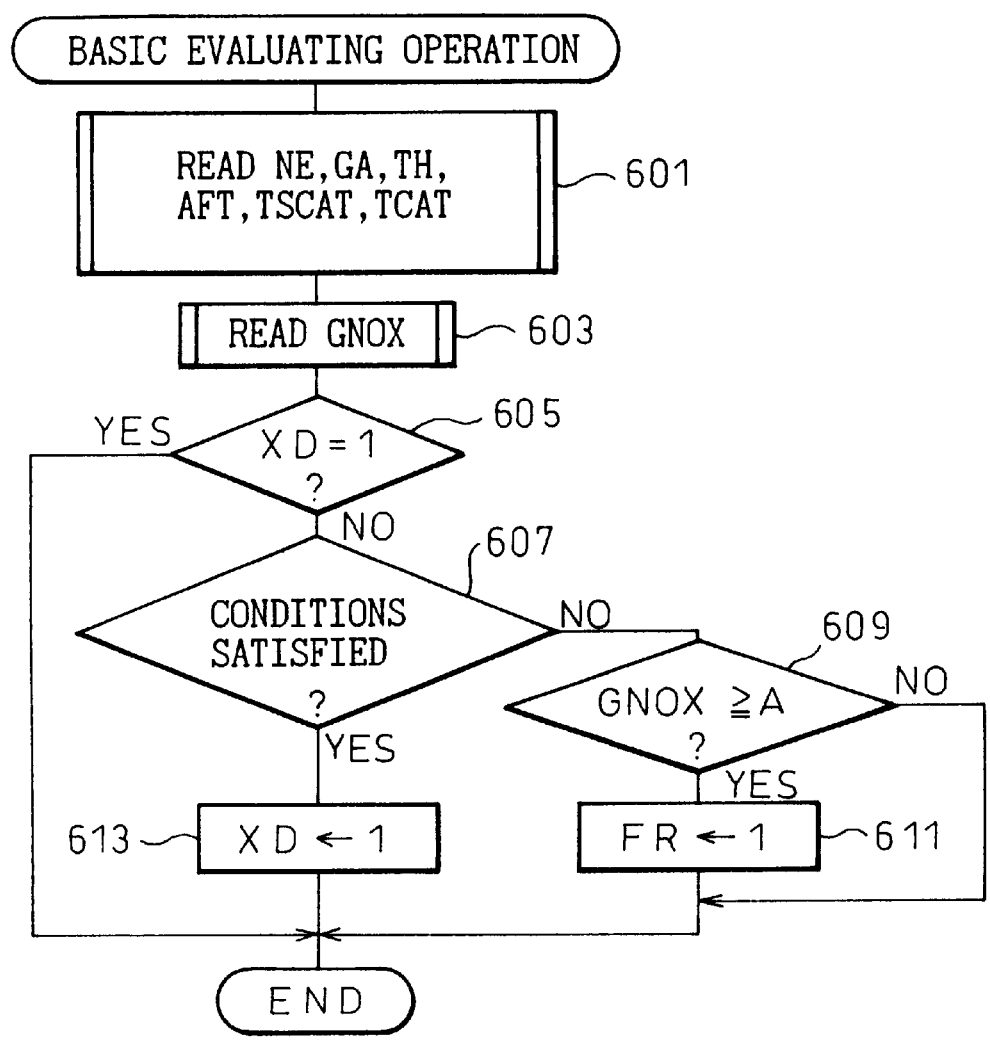
FIG. 7 is a flowchart explaining a part of the evaluating operation of the catalysts.

FIG. 7 is a flowchart illustrating a basic operation for the evaluations. This operation is performed by a routine executed by the ECU 30 at regular intervals.

In FIG. 7, at step 601, parameters representing the engine operating condition and the exhaust gas condition (such as the engine speed NE, intake airflow GA, the degree of opening TH of the throttle valve, the target value AFT of the engine operating air-fuel ratio and the temperatures TSCAT and TCAT of the three-way catalysts 5a, 5b and NORC 7) are read from the respective sensors. The temperatures TSCAT of the three-way catalysts 5a, 5b and the temperature TCAT of the NORC 7 may be directly detected by disposing temperature sensors in the catalyst beds of the three-way catalysts 5a, 5b and the NORC 7, or may be estimated from the exhaust gas temperature and exhaust gas flow (further, the exhaust gas temperature and the exhaust gas flow may be calculated from the engine load condition using the engine speed NE and the intake airflow GA).

At step 603, the amount GNOX of the $NO_X$ currently held in the NORC 7 is read in. As explained before, the amount GNOX is calculated based on the cumulative value of the engine revolutions or the cumulated amount of the $NO_X$ emitted from the engine.

At step 605, the operation determines whether the value of the evaluating operation flag XD is set at 1. XD is the flag set to 1 at step 613 when the conditions for performing the evaluating operation are satisfied and set to 0 at step 1521 in FIG. 15 when the evaluating operation is completed. If XD≠1 at step 605, the operation determines whether the conditions for performing the evaluating operation are satisfied at step 607. At step 607, if the engine speed NE, intake air amount GA and the degree of opening of the throttle valve TH are all stable and within predetermined ranges, and if the temperatures TSCAT of the three-way catalysts 5a, 5b and TCAT of the NORC 7 are within a predetermined range, it is determined that the conditions for performing the evaluating operation are satisfied.

If the conditions are satisfied at step 607, the value of the flag XD is set to 1 at step 613. When the flag XD is set to 1, the evaluating operation of the abilities of the three-way catalysts 5a, 5b and the NORC 7 is performed as explained later, and steps 607 to 613 are not performed unless the value of the flag XD is reset to 0.

If the conditions in step 607 are not satisfied, steps 609 and 611 are performed. Steps 609 and 611 are steps for performing the rich spike operation. Namely, at step 609, it is determined whether the amount of $NO_X$ GNOX reaches a predetermined value A, and if GNOX≧A, a rich spike flag FR is set to 1 at step 611. When the flag FR is set to 1, the operating air-fuel ratio of the engine 1 is changed to a rich air-fuel ratio for a short period by another routine executed by the ECU 30 (not shown), and the $NO_X$ absorbed in the NORC is released and reduced.

As explained above, the basic operation in FIG. 7 starts the evaluating operation every time the conditions are satisfied and, when the conditions are not satisfied, performs the rich spike operation in accordance with the amount of $NO_X$ absorbed and held in the NORC 7.

Figure 8:
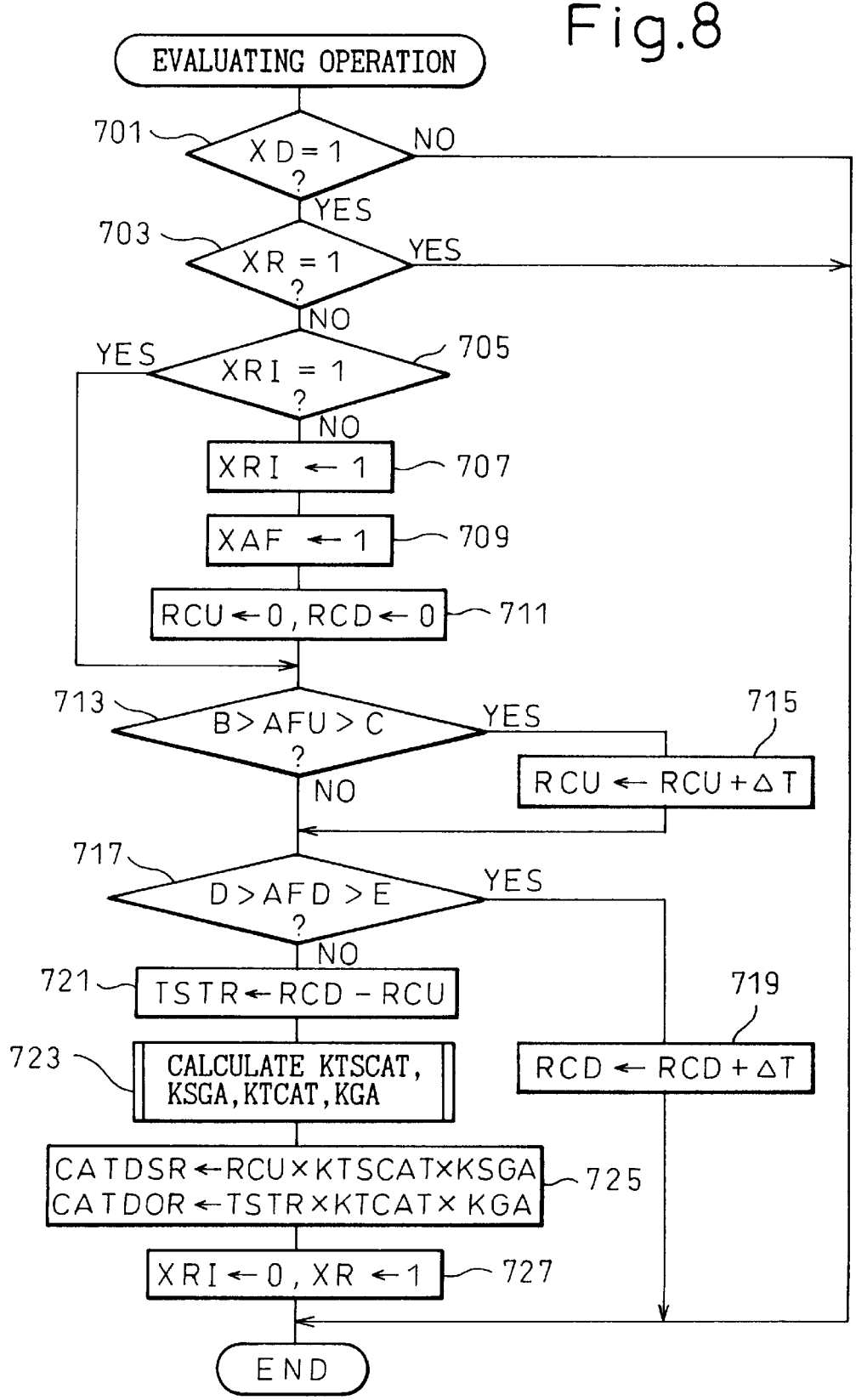
FIG. 8 is a flowchart explaining a part of the evaluating operation of the catalysts.

Next, FIG. 8 is a flowchart illustrating the evaluating operation performed when the air-fuel ratio of the exhaust gas is changed from a lean air-fuel ratio to a rich air-fuel ratio. This operation is performed by a routine executed by the ECU 30 at regular intervals.

In the evaluating operation in FIG. 8, the catalytic abilities of the three-way catalysts 5a, 5b are evaluated by the method (1-A) and the $NO_X$ absorbing capacity of the NORC 7 is evaluated by the method (2-A-1), as explained before.

In FIG. 8, at step 701, the operation determines whether the evaluating operation flag XD is set at 1. If XD≠1 at step 701, since this means that the conditions for performing the evaluating operation are not satisfied, the operation terminates immediately without performing steps 703 through 727. If XD=1 at step 701, the operation determines whether a flag XR is set at 1 at step 703. XR is a completion flag which is set to 1 at step 727 when the evaluating operation in FIG. 8 is completed. If XR=1 at step 703, the operation terminates immediately. Namely, the operation in FIG. 8 is performed only once when the conditions for performing the evaluating operation are satisfied. If XR≠1 at step 703, the operation determines whether a flag XRI is set at 1 at step 705. XRI is a flag in order to perform steps 709 and 711 only once when XR≠1 at step 703. If XRI≠1 at step 705, flag XRI is set to 1 at step 707 and a rich air-fuel ratio operation flag XAF is set to 1 at step 709. Further, the values of counters RCU and RCD are both cleared at step 711. When the rich air-fuel ratio operation flag XAF is set to 1, the fuel injection amount of the engine 1 is adjusted by a fuel injection routine performed by the ECU 30 so that the operating air-fuel ratio of the engine becomes a predetermined rich air-fuel ratio.

Next, at step 713, it is determined whether the air-fuel ratio AFU of the upstream exhaust gas detected by the first air-fuel ratio sensor 31 is within a predetermined range between B and C. The range B–C is a relatively narrow air-fuel ratio range around the stoichiometric air-fuel ratio, i.e., at step 713, it is determined whether the air-fuel ratio of the upstream exhaust gas is near the stoichiometric air-fuel ratio. If the air-fuel ratio of the upstream exhaust gas is within the narrow range around the stoichiometric air-fuel ratio, the value of the counter RCU is increased by ΔT at step 715. ΔT is an interval at which the operation in FIG. 8 is carried out. Therefore, the value of the counter RCU represents the length of the period in which the air-fuel ratio of the upstream exhaust gas is maintained near the stoichiometric air-fuel ratio. Steps 717 and 719 are the operations similar to those of steps 713 and 715. Namely, by performing steps 717 and 719, the value of the counter RCD represents the period in which the air-fuel ratio of the downstream exhaust gas is maintained near the stoichiometric air-fuel ratio. AFD in step 717 is the air-fuel ratio of the downstream exhaust gas detected by the second air-fuel ratio sensor 33 and the air-fuel ratio range D–E is a narrow range around the stoichiometric air-fuel ratio.

After calculating the length of the period in which the air-fuel ratio of the downstream exhaust gas is maintained near the stoichiometric air-fuel ratio, when the air-fuel ratio of the downstream exhaust gas deviates from the air-fuel ratio range D–E, step 721 is performed. At step 721, the length of the period TSTR in FIG. 3(B) is calculated by TSTR=RCD−RCU. The reason why the TSTR is obtained by subtracting RCU from RCD is that the air-fuel ratio of the upstream exhaust gas becomes the stoichiometric air-fuel ratio for a short period due to the $O_2$ storage capability of the three-way catalysts 5a and 5b when the operating air-fuel ratio of the engine is changed from a lean air-fuel ratio to a rich air-fuel ratio. Therefore, during the period RCU, substantially no $NO_X$ is released from the NORC 7. Therefore it is necessary to measure TSTR from the time when the air-fuel ratio of the upstream exhaust gas changes from the stoichiometric to a rich air-fuel ratio in order to evaluate the $NO_X$ absorbing capacity of the NORC 7 precisely.

Figure 9:
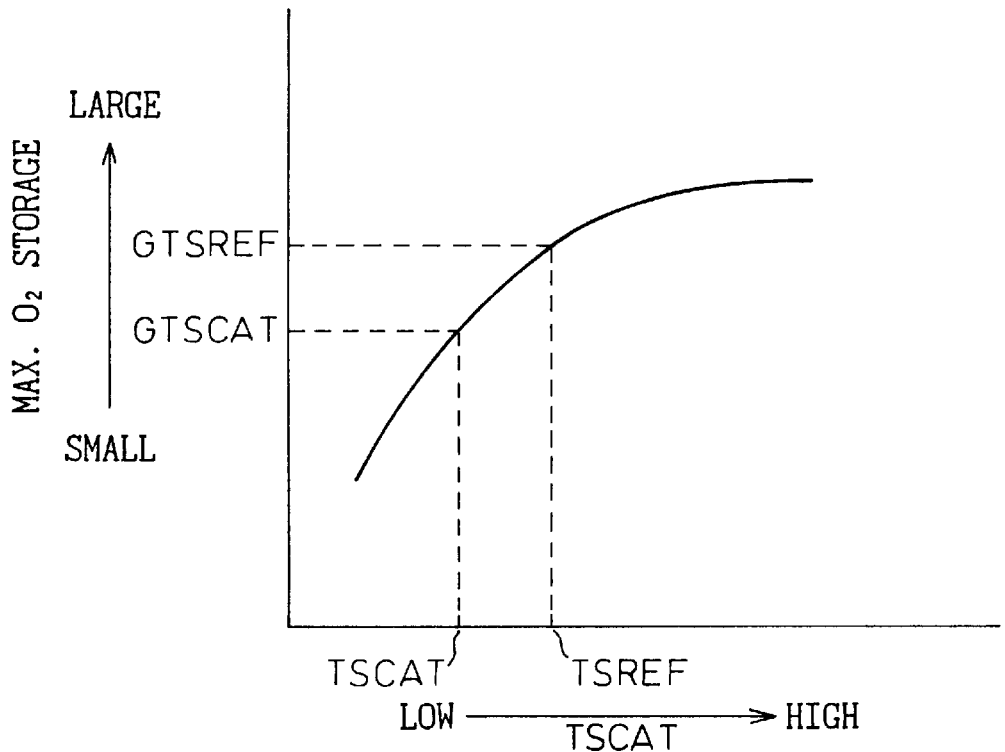
FIG. 9 is a chart explaining the correction of the ability of the three-way catalyst based on the temperature of the three-way catalyst.

As explained before, the time RCU and TSTR correspond to the catalytic abilities of the three-way catalysts 5a, 5b and the $NO_X$ absorbing capacity of the NORC 7. However, the values of RCU and TSTR change in accordance with the condition of the exhaust gas (for example, temperature and the flow rate of the exhaust gas) even though the catalytic abilities of the three-way catalysts 5a, 5b and the $NO_X$ absorbing capacity of the NORC 7 do not change. FIG. 9 is a diagram illustrating the change in the catalytic ability (i.e., the maximum amount of $O_2$ storage) of a new (not deteriorated) three-way catalyst in accordance with the temperature TSCAT thereof. As is seen from FIG. 9, the maximum $O_2$ storage capability largely changes when the temperature TSCAT changes. Since the time RCU corresponds to the maximum $O_2$ storage capability under the current catalyst temperature TSCAT, the calculated value of RCU must be converted to the value under a reference catalyst temperature in order to evaluate the $O_2$ storage capability of the three-way catalysts.

In this embodiment, a reference $O_2$ storage capability GTSCAT of a new three-way catalyst at the temperature TSCAT and another reference $O_2$ storage capability GTSREF of a new three-way catalyst at a reference temperature TSREF (refer to FIG. 9) are used for correcting the calculated RCU. Since the $O_2$ storage capability of a new three-way catalyst is GTSCAT at the temperature TSCAT and GTSREF at the temperature TSREF, the $NO_X$ absorbing capacity of the present three-way catalyst at the reference temperature TSREF can be calculated by RCU×(GTSREF/GTSCAT). Therefore, a temperature correction factor KTSCAT is calculated by the values GTSREF and GTSCAT obtained from FIG. 9 by KTSCAT=GTSREF/GTSCAT.

Further, the time RCU also changes in accordance with the air-fuel ratio and the flow rate of the exhaust gas flowing into the three-way catalyst. When the air-fuel ratio of the exhaust gas is low, or the flow rate of the exhaust gas is high, the amount of $O_2$ released from the three-way catalyst per unit time becomes large. Therefore, in this case, the time RCU becomes shorter as the air-fuel ratio of the exhaust gas becomes lower or the flow rate of the exhaust gas becomes larger even though the amount of $O_2$ absorbed in the catalyst is the same. In this embodiment, since the air-fuel ratio of the upstream exhaust gas is maintained at a predetermined rich air-fuel ratio when the rich operation flag XAF is set at 1, it is not necessary to consider the difference of the air-fuel ratio of the exhaust gas. However, since the flow rate of the exhaust gas changes in accordance with the operating condition of the engine, it is necessary to correct the calculated value of RCU in accordance with the flow rate of the exhaust gas.

Figure 10:
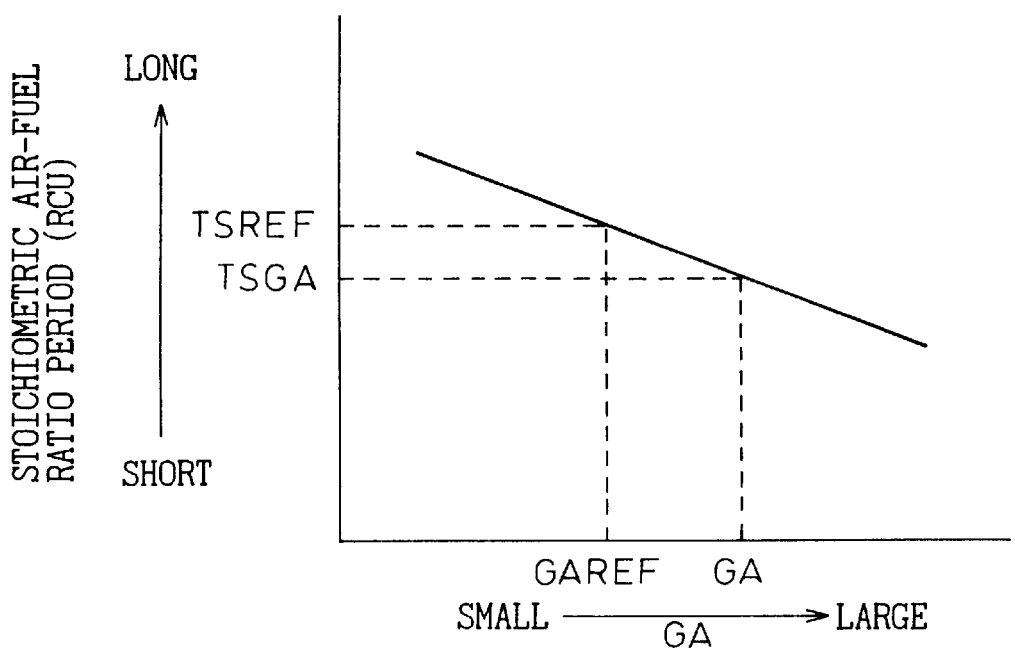
FIG. 10 is a chart explaining the correction of the ability of the three-way catalyst based on the exhaust gas flow rate.

FIG. 10 is a diagram showing the change in the time RCU of a new three-way catalyst in accordance with the flow rate of the exhaust gas (i.e., the flow rate GA of the intake air). As is seen from FIG. 10, the time RCU becomes shorter as the flow rate GA increases. In this embodiment, the flow rate correction factor KSGA is calculated in the same manner as that of the temperature correction factor KTSCAT, i.e., by KSGA=TSREF/TSGA. TSREF is the value of RCU of a new three-way catalyst when the flow rate is a reference value GAREF, and TSGA is the value of RCU of a new three-way catalyst under the current flow rate GA.

Figure 11:
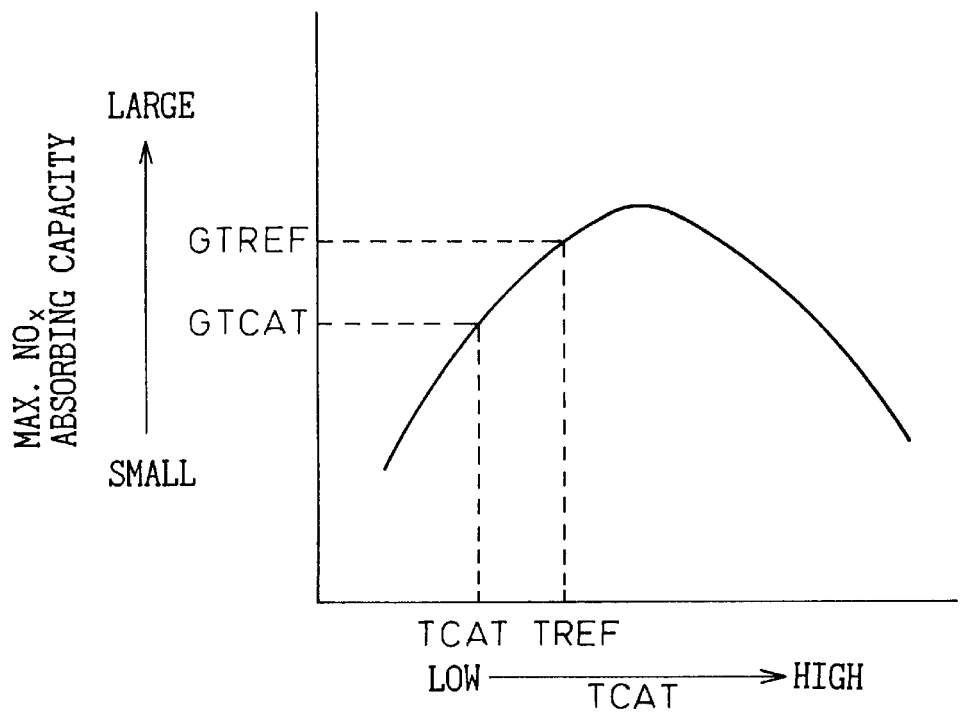
FIG. 11 is a chart explaining the correction of the ability of the NORC based on the temperature of the NORC.
Figure 12:
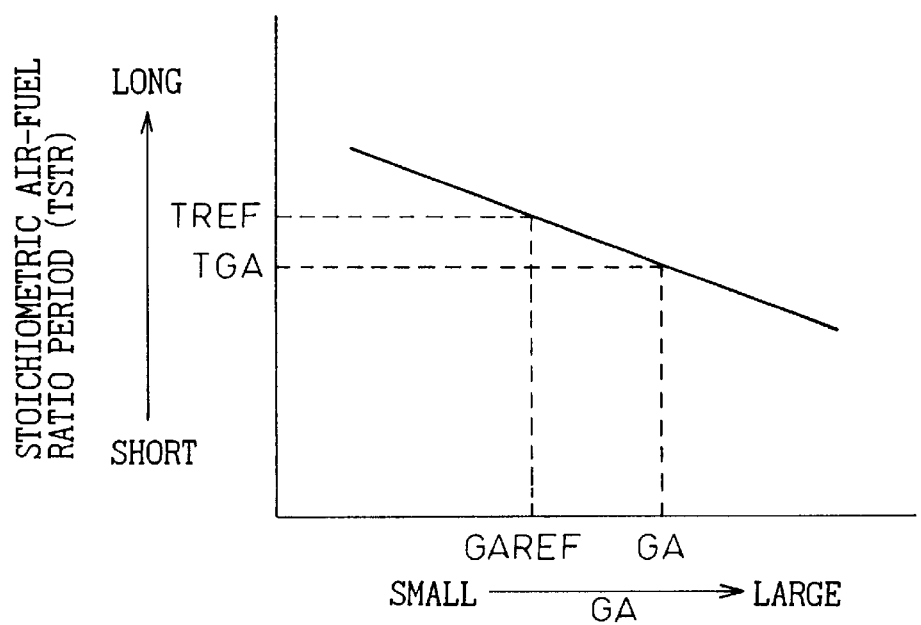
FIG. 12 is a chart explaining the correction of the ability of the NORC based on the exhaust gas flow rate.

Further, similarly to the three-way catalyst, the time TSTR which corresponds to the $NO_X$ absorbing capacity of the NORC changes in accordance with the exhaust gas temperature and flow rate even though the $NO_X$ absorbing capacity of the NORC is the same. FIGS. 11 and 12 are diagrams similar to FIGS. 9 and 10 illustrating the change in the maximum $NO_X$ absorbing capacity of a new (not deteriorated) NORC in accordance with the temperature (FIG. 11) and the exhaust gas flow rate (FIG. 12). As is seen from FIG. 11, the maximum $NO_X$ absorbing capacity largely changes when the temperature TCAT changes. In this embodiment, the temperature correction facto KTCAT is calculated from FIG. 11 by KTCAT=GTREF/GTCAT. GTCAT is a reference $NO_X$ absorbing capacity GTCAT of a new NORC at the temperature TCAT, and GTREF is another reference $NO_X$ absorbing capacity of a new NORC at a reference temperature TREF (refer to FIG. 11). By correcting the time TSTR by multiplying the temperature correction factor KTCAT, the $NO_X$ absorbing capacity can be precisely evaluated regardless of the difference in the temperature of the NORC.

Further, the time TSTR also changes in accordance with the air-fuel ratio and the flow rate of the exhaust gas flowing into the NORC. When the air-fuel ratio of the exhaust gas is low, or the flow rate of the exhaust gas is high, the amount of HC and CO flowing into the NORC per unit time becomes large. Therefore, in this case, the amount of $NO_X$ released from the catalyst per unit time also becomes large. Namely, the time TSTR becomes shorter as the air-fuel ratio of the exhaust gas becomes lower or the flow rate of the exhaust gas becomes higher even though the amount of $NO_X$ absorbed in the catalyst is the same. In this embodiment, since the air-fuel ratio of the upstream exhaust gas is maintained at a predetermined rich air-fuel ratio when the rich operation flag XAF is set at 1, it is not necessary to consider the difference of the air-fuel ratio of the exhaust gas. However, since the flow rate of the exhaust gas changes in accordance with the operating condition of the engine, it is necessary to correct the calculated value of TSTR in accordance with the flow rate of the exhaust gas.

FIG. 12 is a diagram showing the change in the time TSTR of a new NORC in accordance with the flow rate of the exhaust gas (i.e., the flow rate GA of the intake air). As is seen from FIG. 12, the time TSTR becomes shorter as the flow rate GA increases. In this embodiment, the flow rate correction factor KGA is calculated in the same manner as that of the temperature correction factor KTCAT, i.e., by KGA=TREF/TGA. TREF is the value of TSTR of a new NORC when the flow rate is a reference value GAREF and TGA is the value of TSTR of a new NORC under the current flow rate GA.

In FIG. 8, step 723, the temperature correction factors KTSCAT, KTCAT and the flow rate correction factors KSGA, KGA are calculated based on the relationship in FIGS. 9 through 12, and the corrected value CATDSR of the RCU and CATDOR of the TSTR are calculated by CATDSR=RCU×KTSCAT×KSGA, and CATDOR=TSTR× KTCAT×KGA at step 725.

After calculating CATDSR and CATDOR at step 725, the values of the flag XRI and XR are set to 1 to indicate that the evaluating operation in FIG. 8 is completed and, when the operation is next performed, the operation terminates immediately after step 703.

Figure 13:
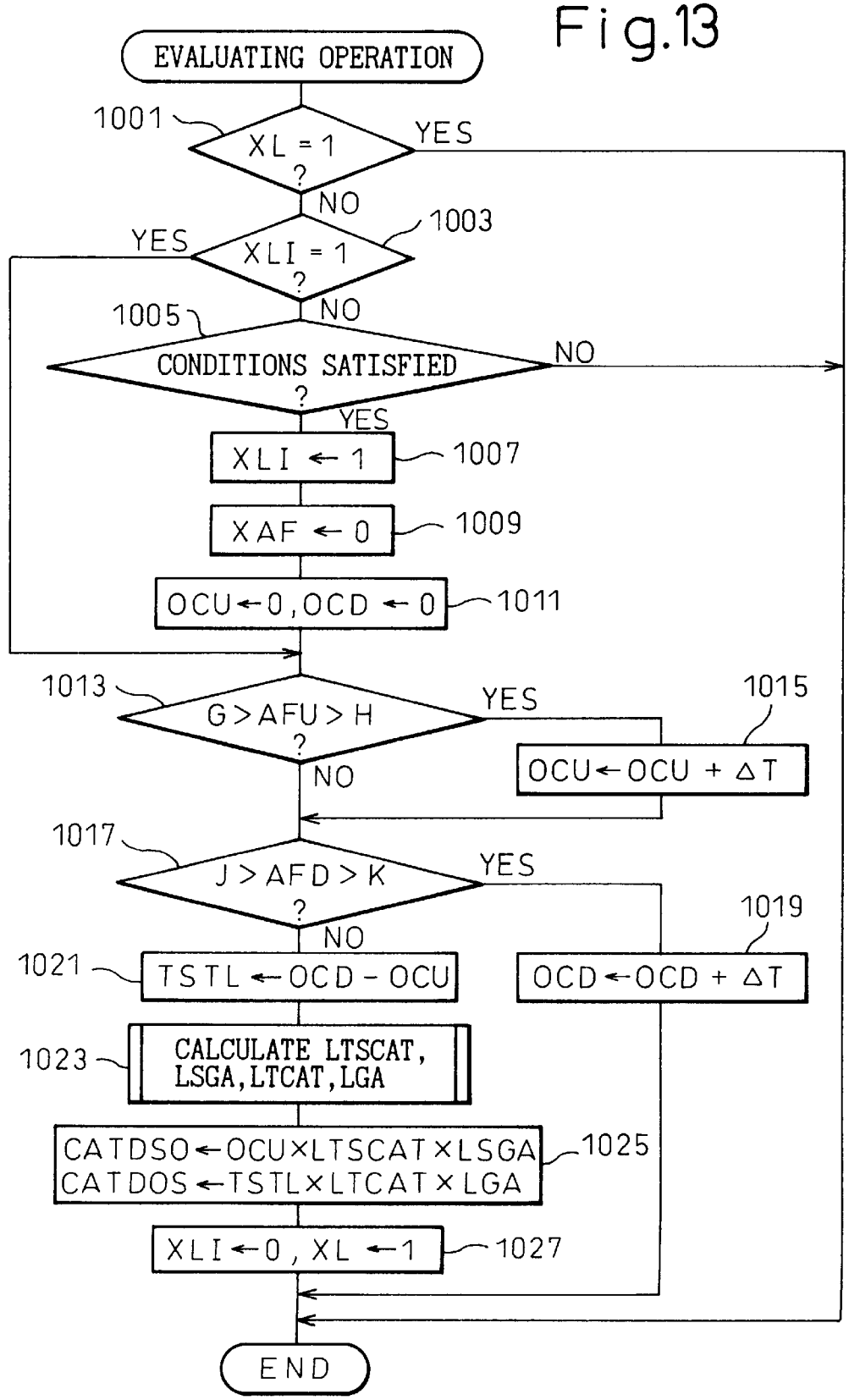
FIG. 13 is a flowchart explaining a part of the evaluating operation of the catalysts.

Next, FIG. 13 is a flowchart illustrating the evaluating operation performed when the air-fuel ratio of the exhaust gas is changed from a rich air-fuel ratio to a lean air-fuel ratio. This operation is performed by a routine executed by the ECU 30 at regular intervals.

In the evaluating operation in FIG. 13, the catalytic abilities of the three-way catalysts 5a, 5b are evaluated by the method (1-B) (based on the time OCU in FIG. 2(B)) and the catalytic ability of the NORC 7 is evaluated by the method (2-B) (based on the time TSTL in FIG. 6(B)), respectively. Also in this evaluating operation, the time OCU and TSTL are corrected in accordance with the condition of the exhaust gas in the manner similar to the corrections of RCU and TSTR.

In FIG. 13, at steps 1001 and 1003, it is determined whether the values of the flags XL and XLI are set at 1. XL is a flag representing whether the evaluating operation in FIG. 13 has been completed. The flag XL has a function similar to that of the flag XR in FIG. 8. Further, the XLI is a flag having a function similar to that of the flag XRI in FIG. 8, i.e., the function for performing steps 1005 to 1011 only once.

At step 1005, it is determined whether the conditions for performing the evaluating operation are satisfied. The conditions determined at step 1005 are (a) that the value of the flag XD is set at 1 and (b) that the value of the flag XR is set at 1, i.e., the evaluating operation in FIG. 8 has been completed.

If both conditions are satisfied at step 1005, the flag XLI is set to 1 at step 1007 and the flag XAF is set to 0 at step 1009. When the flag XAF is set to 0, the fuel injection amount of the engine 1 is adjusted by the fuel injection routine separately performed by the ECU 30 so that the operating air-fuel ratio of the engine 1 becomes a predetermined lean air-fuel ratio. Further, at step 1011, the values of counters OCU and OCD are cleared. The counters OCU and OCD are the counters having functions the same as those of the counters RCU and RCD in FIG. 8.

Steps 1013 to 1027 are operations similar to those of steps 713 to 727 in FIG. 8. The air-fuel ratio ranges G–H in step 1013 and J–K in step 1017 are narrow ranges around the stoichiometric air-fuel ratio. TSTL in step 1021 is the length of the period in which the air-fuel ratio of the exhaust gas downstream of the NORC 7 is maintained near the stoichiometric air-fuel ratio and LTSCAT and LTCAT (step 1023) are temperature correction factors determined from the relationships similar to those in FIGS. 9 and 11. LSGA and LGA (step 1023) are flow correction factors determined from the relationships similar to those in FIGS. 10 and 12.

In the operation in FIG. 13, the catalytic abilities of the three-way catalyst CATDSO and the catalytic ability CATDOS of the NORC are calculated at step 1025 by CATDSO= OCU×LTSCAT×LSGA, and CATDOS=TSTL×LTCAT× LGA.

Figure 14:
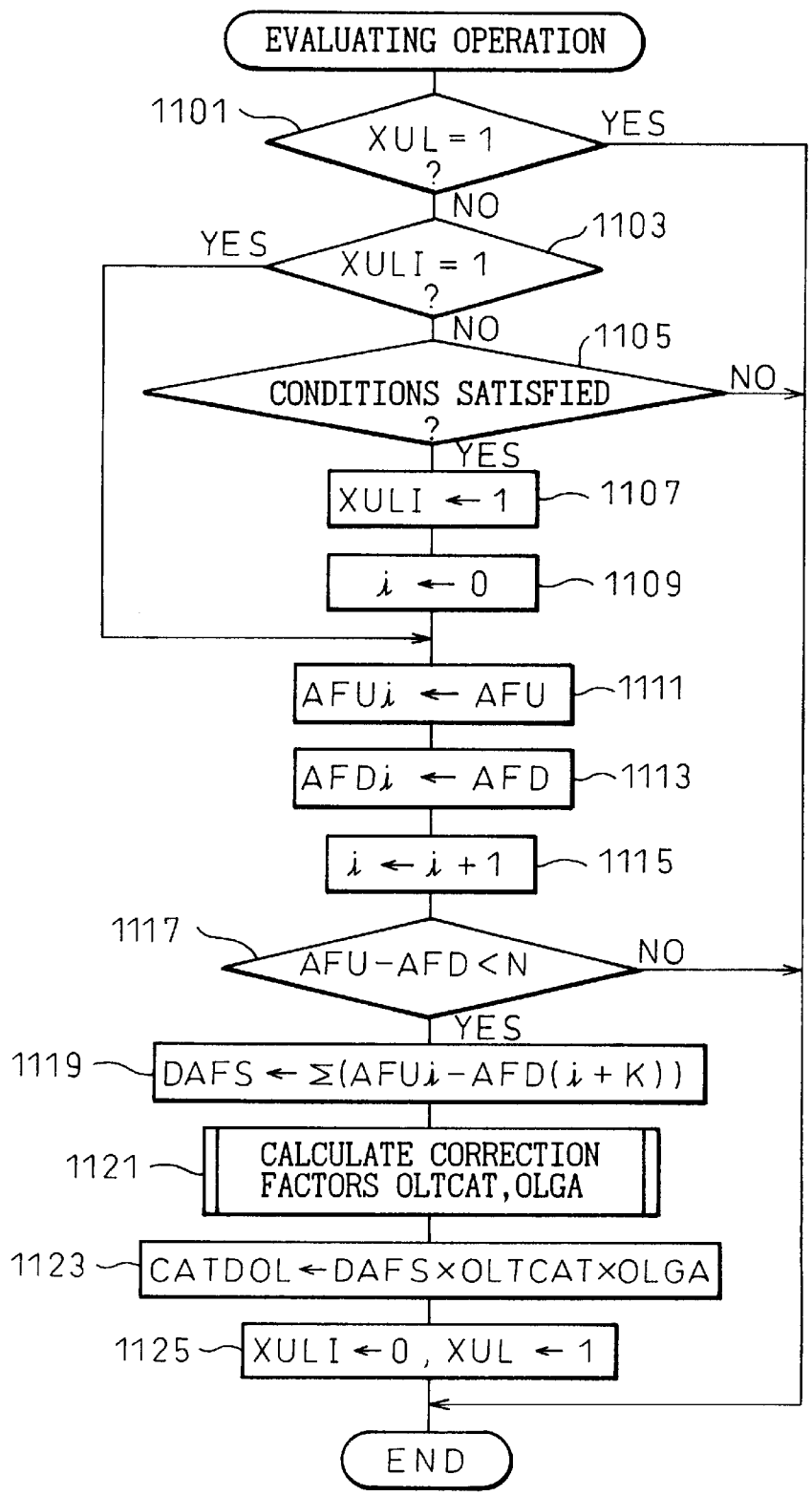
FIG. 14 is a flowchart explaining a part of the evaluating operation of the catalysts.

FIG. 14 is a flowchart illustrating the evaluating operation of the $NO_X$ absorbing capacity of the NORC based on the method (2-A-2). This operation is carried out by a routine executed by the ECU 30 at regular intervals. In this operation, the $NO_X$ absorbing capacity is obtained by calculating the cumulative value of the difference between the air-fuel ratios of the exhaust gases upstream and downstream of the NORC. The calculated cumulative value is also corrected according to the exhaust gas conditions.

In FIG. 14, steps 1101 through 1109 are the operations similar to steps 1001 through 1011 in FIG. 13 except that XUL in step 1101 is a flag representing that the evaluating operation in FIG. 14 has been completed and that the conditions in step 1105 for performing the evaluating operation include that XL=1 in addition to XD=1 and XR=1.

Namely, the evaluating operation in FIG. 14 is performed after the evaluating operations in FIGS. 8 and 13 have been completed. Further, in this operation, a counter i (step 1109) is used for calculating the cumulative value of the difference of the air-fuel ratios of the upstream and downstream exhaust gas.

In this operation, the air-fuel ratio AFU of the exhaust gas of the NORC 7 and the air-fuel ratio AFD of the exhaust gas downstream of the NORC 7 are stored in RAM as AFUi and AFDi at steps 1111 and 1113, respectively. The value of i is increased by 1 every time the operation is carried out (step 1115). At step 1117, the difference between AFU and AFD is compared with a predetermined value N (N is a small constant value). If (AFU−AFD)<N at step 1117, this means that the air-fuel ratio of the exhaust gas downstream of the NORC becomes nearly the same as that of the exhaust gas upstream of the NORC, and that the NORC does not absorb $NO_X$ any more, the cumulative values DAFS of the deviation of the air-fuel ratio of the downstream exhaust gas from the air-fuel ratio of the upstream exhaust gas is calculated at step 1119. In this embodiment, considering the delay time TD (FIG. 4(B)) caused by the travel of the exhaust gas between the air-fuel ratio sensors 31 and 33, the deviation is defined as (AFUi−AFD(i+k)). Namely, it is assumed that the exhaust gas passing the first air-fuel ratio sensor 31 reaches the second air-fuel ratio sensor 33 after the operation in FIG. 14 is performed k times. The value of k may be changed in accordance with the operating condition (such as exhaust gas velocity in the exhaust gas passage).

After calculating the cumulative value DAFS (i.e., the area of the hatched portion in FIG. 4(B)), the operation calculates a temperature correction factor OLTCAT and a flow rate correction factor OLGA at step 1121. The correction factors OLTCAT and OLGA are calculated based on the relationships similar to those in FIGS. 11 and 12. The $NO_X$ absorbing capacity CATDOL of the NORC 7 is calculated by CATDOL=DAFS×OLTCAT×OLGA.

Further, in this embodiment, the failure of the exhaust gas purification device is determined based on the catalytic abilities CATDSR, CATDSO calculated by the operation in FIGS. 8 and 14, and the $NO_X$ absorbing capacity CATDOR, CATDOL and the catalytic ability CATDOS of the NORC calculated by the operation in FIGS. 8, 13 and 14.

Figure 15:
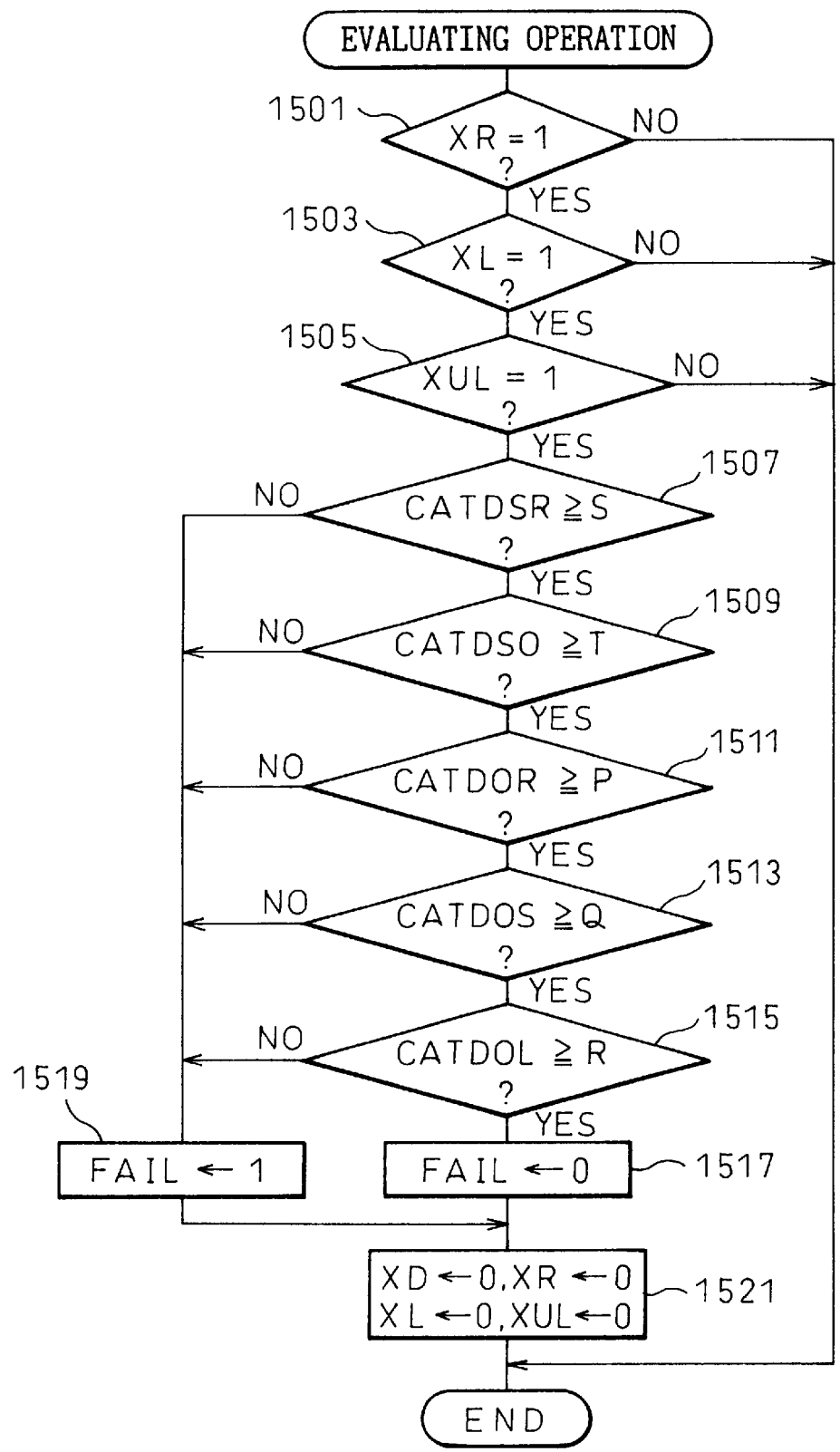
FIG. 15 is a flowchart explaining a part of the evaluating operation of the catalysts.

FIG. 15 is a flowchart illustrating the determining operation of the failure of the exhaust gas purification device according to the embodiment. This operation is performed by a routine executed by the ECU 30 at regular intervals. In FIG. 15, at steps 1501 through 1505, it is determined whether all of the evaluating operations in FIGS. 8, 13 and 14 have been completed based on the values of the flags XR, XL AND XUL. If any of these evaluating operations is not completed, the operation terminates without determining the failure of the exhaust gas purification device.

If all of the evaluating operations in FIGS. 8, 13 and 14 have been completed, the operation determines whether the value of CATDSR calculated by the operation in FIG. 8 and representing the catalytic abilities of the three-way catalysts 5a and 5b is larger than a predetermined reference value S at step 1507, and determines whether the value of CATDSO calculated by the operation in FIG. 13 and also representing the catalytic abilities of the three-way catalysts 5a and 5b is larger than a predetermined reference value T at step 1509.

Further, at step 1511, the operation determines whether the value of CATDOR calculated by the operation in FIG. 8 and representing the $NO_X$ absorbing capacity of the NORC 7 is larger than a predetermined reference value P, and determines whether the value of CATDOS calculated by the operation in FIG. 13 and representing the catalytic ability of the NORC 7 is larger than a predetermined reference value Q at step 1513. Further, the operation determines whether CATDOL calculated by the operation in FIG. 14 and representing the $NO_X$ absorbing capacity of the NORC 7 is larger than a predetermined reference value R.

If any of CATDSR, CATDSO, CATDOR, CATDOS and CATDOL is smaller than the reference values, the operation sets the value of a failure flag FAIL to 1 at step 1519. If all of CATDSR, CATDSO, CATDOR, CATDOS and CATDOL are larger than the reference values, the operation sets the value of the failure flag FAIL to 0 at step 1517. After setting the value of the flag FAIL at steps 1517 or 1519, the operation resets values of all the flags XD, XR, XL and XU to 0 at step 1521. In this embodiment, the reference values P, Q, R, S, T are obtained by experiment using three-way catalyst and the NORC which have deteriorated to an allowable limits.

Further, in this embodiment, an alarm disposed near the driver seat of the vehicle is activated when the failure flag FAIL is set to 1 in order to warn the driver that the exhaust gas purification device has failed.

Further, though the exhaust gas purification device is determined as having failed when any of CATDSR, CATDSO, CATDOR, CATDOS and CATDOL is smaller than the respective reference values in this embodiment, the deterioration of the three-way catalysts and the deterioration of the NORC may be determined separately. Namely, if CATDSR or CATDSO is smaller than the respective reference values in steps 1507 and 1509, the three-way catalysts may be determined as having failed, and if one or more of CATDOR, CATDOS and CATDOL is smaller than the respective reference values at steps 1511 through 1515, the NORC may be determined as having deteriorated.

As explained above, according to this embodiment, the abilities of both the three-way catalyst and the NORC can be evaluated in one changing operation of the exhaust gas air-fuel ratio (a lean air-fuel ratio→a rich air-fuel ratio→a lean air-fuel ratio) based on the outputs of only the first and the second air-fuel ratio sensor.

Though the operating air-fuel ratio of the engine is changed in order to change the air-fuel ratio of the exhaust gas flowing into the three-way catalyst and the NORC in this embodiment, the air-fuel ratio of the exhaust gas can be changed without changing the operating air-fuel ratio of the engine. For example, the air-fuel ratio of the exhaust gas may be changed by secondary fuel injections when the engine is provided with direct cylinder fuel injection valves which inject fuel directly into the cylinder. In this case, the secondary fuel injection is performed during the expansion or exhaust stroke of the respective cylinders so that the fuel injected by the second fuel injections leaves the cylinders without burning, i.e., without changing the operating air-fuel ratio of the engine. Further, the air-fuel ratio of the exhaust gas may be changed by a reducing agent supply unit or a secondary air supply unit which supply reducing agent (such as gaseous or liquid HC) or a secondary air to the exhaust gas passage upstream of the three-way catalysts. In this case, the air-fuel ratio of the exhaust gas can be changed by controlling the amount of the reducing agent or the secondary air without changing the operating air-fuel ratio of the engine.

What is claimed is:

1. An exhaust gas purification device for an internal combustion engine comprising:

a three-way catalyst disposed in the exhaust gas passage of an internal combustion engine;

a $NO_X$ occluding and reducing catalyst disposed in the exhaust gas passage downstream of the three-way catalyst and absorbing $NO_X$ in the exhaust gas when the air-fuel ratio of the exhaust gas flowing into the $NO_X$ occluding and reducing catalyst is at a lean air-fuel ratio and releasing and reducing the absorbed $NO_X$ when the air-fuel ratio of the exhaust gas flowing into the $NO_X$ occluding and reducing catalyst is at a stoichiometric or a rich air-fuel ratio;

a first air-fuel ratio sensor disposed in the exhaust gas passage at the position between the three-way catalyst and the $NO_X$ occluding and reducing catalyst;

a second air-fuel ratio sensor disposed in the exhaust gas passage downstream of the $NO_X$ occluding and reducing catalyst;

air-fuel ratio control means for switching the air-fuel ratio of the exhaust gas flowing into the three-way catalyst either from a rich air-fuel ratio to a lean air-fuel ratio or from a lean air-fuel ratio to a rich air-fuel ratio; and evaluating means for evaluating the abilities of both of the three-way catalyst and the $NO_X$ occluding and reducing catalyst when the air-fuel ratio control means switches the air-fuel ratio of the exhaust gas either from a rich air-fuel ratio to a lean air-fuel ratio or from a lean air-fuel ratio to a rich air-fuel ratio, wherein the evaluating means evaluates the ability of the three-way catalyst based on the output signal of the first air-fuel ratio sensor and evaluates the ability of the $NO_X$ occluding and reducing catalyst based on the output signals of both the first and the second air-fuel ratio sensors.

2. An exhaust gas purification device as set forth in claim 1, wherein the evaluating means evaluates the ability of the three-way catalyst based on the length of the period in which the fist air-fuel ratio sensor outputs a signal corresponding to a stoichiometric air-fuel ratio when the air-fuel ratio control means switches the air-fuel ratio of the exhaust gas either from a rich air-fuel ratio to a lean air-fuel ratio or from a lean air-fuel ratio to a rich air-fuel ratio.

3. An exhaust gas purification device as set forth in claim 1, wherein the evaluating means evaluates the ability of the three-way catalyst based on the output signals of the first air-fuel ratio sensor when the air-fuel ratio control means switches the air-fuel ratio of the exhaust gas both from a rich air-fuel ratio to a lean air-fuel ratio and from a lean air-fuel ratio to a rich air-fuel ratio.

4. An exhaust gas purification device as set forth in claim 1, further comprising correcting means for correcting at least one of the abilities of the three-way catalyst and the $NO_X$ occluding and reducing catalyst evaluated by the evaluating means based on the condition of the exhaust gas flowing into the three-way catalyst.

5. An exhaust gas purification device as set forth in claim 2, further comprising correcting means for correcting at least one of the abilities of the three-way catalyst and the $NO_X$ occluding and reducing catalyst evaluated by the evaluating means based on the condition of the exhaust gas flowing into the three-way catalyst.

6. An exhaust gas purification device as set forth in claim 3, further comprising correcting means for correcting at least one of the abilities of the three-way catalyst and the $NO_X$ occluding and reducing catalyst evaluated by the evaluating means based on the condition of the exhaust gas flowing into the three-way catalyst.

* * * * *